United States Patent
Ilincic et al.

(10) Patent No.: US 12,174,991 B2
(45) Date of Patent: *Dec. 24, 2024

(54) SYSTEMS AND METHODS FOR DATA ACCESS CONTROL OF PERSONAL USER DATA USING A SHORT-RANGE TRANSCEIVER

(71) Applicant: Capital One Services, LLC, McLean, VA (US)

(72) Inventors: Rajko Ilincic, Annandale, VA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/307,870

(22) Filed: May 4, 2021

(65) Prior Publication Data

US 2021/0342477 A1 Nov. 4, 2021

Related U.S. Application Data

(63) Continuation of application No. 16/863,750, filed on Apr. 30, 2020, now Pat. No. 11,030,339.

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *H04L 9/0819* (2013.01); *H04L 9/3213* (2013.01); *H04L 9/3234* (2013.01)

(58) Field of Classification Search
None
See application file for complete search history.

(56) References Cited

U.S. PATENT DOCUMENTS

| 4,683,553 A | ‡ | 7/1987 | Mollier | G07F 7/1008 705/55 |
| 4,827,113 A | ‡ | 5/1989 | Rikuna | G06Q 20/341 235/432 |

(Continued)

FOREIGN PATENT DOCUMENTS

| CA | 3010336 | ‡ | 7/2017 |
| CN | 101192295 | ‡ | 6/2008 |

(Continued)

OTHER PUBLICATIONS

Author Unknown, "Multi-Factor Authentication", idaptive [online] 2019 [retrieved on Mar. 25, 2019]. Retrieved from Internet URL: https://vw.centrify.com/products/application-services/adaptive-multi-factor- authentication/risk-based-mfa/, 10 pages.‡

(Continued)

*Primary Examiner* — Trang T Doan
(74) *Attorney, Agent, or Firm* — KDW Firm PLLC; Andrew D. Kasnevich

(57) ABSTRACT

Systems and methods for controlling data access through the interaction of a short-range transceiver, such as a contactless card, with a client device are presented. An exemplary system and method may include establishing a database storing identifiers and keys for users and service providers, receiving from a client device of the service provider, via a network, a service provider token and a request for a data access key, the request generated in response to a tap action between a contactless card associated with a user and the client device, verifying the service provider is authorized to receive access to personal user data encrypted and stored on the contactless card, generating a data access key based on a user key, and transmitting to the service provider client device, via the network, the data access key, such that the (Continued)

System 100 client device may decrypt the personal user data obtained from the contactless card.

20 Claims, 13 Drawing Sheets

(51) Int. Cl.
    *H04L 9/08*     (2006.01)
    *H04L 9/32*     (2006.01)

(56) References Cited

U.S. PATENT DOCUMENTS

| | | | | |
|---|---|---|---|---|
| 4,910,773 A ‡ | 3/1990 | Hazard | ............... | G07F 7/1016 380/277 |
| 5,036,461 A ‡ | 7/1991 | Elliott | ............... | G06Q 20/105 705/44 |
| 5,363,448 A ‡ | 11/1994 | Koopman, Jr. | ......... | G06F 7/584 340/5.26 |
| 5,377,270 A ‡ | 12/1994 | Koopman, Jr. | ........... | H04L 9/12 340/5.26 |
| 5,533,126 A ‡ | 7/1996 | Hazard | ............... | G06Q 20/341 713/187 |
| 5,537,314 A ‡ | 7/1996 | Kanter | ............... | G06Q 20/342 705/14.13 |
| 5,592,553 A ‡ | 1/1997 | Guski | ............... | G06F 21/31 713/159 |
| 5,616,901 A ‡ | 4/1997 | Crandall | ............... | G07F 19/20 235/379 |
| 5,666,415 A ‡ | 9/1997 | Kaufman | ............ | H04L 9/3226 380/28 |
| 5,764,789 A ‡ | 6/1998 | Pare, Jr. | ............... | G06Q 20/02 382/115 |
| 5,768,373 A ‡ | 6/1998 | Lohstroh | ............ | G06F 21/31 380/286 |
| 5,778,072 A ‡ | 7/1998 | Samar | ............... | G06F 21/34 380/30 |
| 5,796,827 A ‡ | 8/1998 | Coppersmith | ... | G06K 19/07758 713/182 |
| 5,832,090 A ‡ | 11/1998 | Raspotnik | .......... | G06Q 20/3672 705/66 |
| 5,883,810 A ‡ | 3/1999 | Franklin | ............... | G06Q 30/06 700/232 |
| 5,901,874 A ‡ | 5/1999 | Deters | ............... | B65F 1/16 220/694 |
| 5,929,413 A ‡ | 7/1999 | Gardner | ............... | G06Q 20/18 235/379 |
| 5,960,411 A ‡ | 9/1999 | Hartman | ............ | G06Q 30/0605 705/26.81 |
| 6,021,203 A ‡ | 2/2000 | Douceur | ............... | H04L 9/0656 380/252 |
| 6,049,328 A ‡ | 4/2000 | Vanderheiden | ....... | G06F 3/0488 341/21 |
| 6,058,373 A ‡ | 5/2000 | Blinn | ............... | G06Q 10/087 705/22 |
| 6,061,666 A ‡ | 5/2000 | Do | ............... | G06Q 20/1085 235/379 |
| 6,105,013 A ‡ | 8/2000 | Curry | ............... | G06Q 20/341 705/65 |
| 6,199,114 B1 ‡ | 3/2001 | White | ............... | G06F 21/10 709/203 |
| 6,199,762 B1 ‡ | 3/2001 | Hohle | ............... | G06K 17/00 235/492 |
| 6,216,227 B1 ‡ | 4/2001 | Goldstein | ............ | G06Q 20/045 705/65 |
| 6,227,447 B1 ‡ | 5/2001 | Campisano | .......... | G06Q 20/385 235/380 |
| 6,282,522 B1 ‡ | 8/2001 | Davis | ............... | G06Q 20/02 235/375 |
| 6,324,271 B1 ‡ | 11/2001 | Sawyer | ............... | H04M 1/57 379/142.04 |
| 6,342,844 B1 ‡ | 1/2002 | Rozin | ............... | G07B 15/063 340/928 |
| 6,367,011 B1 ‡ | 4/2002 | Lee | ............... | G06F 21/77 380/255 |
| 6,402,028 B1 ‡ | 6/2002 | Graham, Jr. | ......... | G06Q 20/341 235/380 |
| 6,438,550 B1 ‡ | 8/2002 | Doyle | ............... | G06F 21/33 380/258 |
| 6,501,847 B2 ‡ | 12/2002 | Helot | ............... | G06K 9/00013 382/126 |
| 6,631,197 B1 ‡ | 10/2003 | Taenzer | ............... | H04R 25/606 381/316 |
| 6,641,050 B2 ‡ | 11/2003 | Kelley | ............... | G06K 19/073 235/380 |
| 6,655,585 B2 ‡ | 12/2003 | Shinn | ............... | G07C 9/257 235/382 |
| 6,662,020 B1 ‡ | 12/2003 | Aaro | ............... | G06Q 20/32 455/411 |
| 6,721,706 B1 ‡ | 4/2004 | Strubbe | ............... | G10L 15/22 704/275 |
| 6,731,778 B1 ‡ | 5/2004 | Oda | ............... | H04N 5/2259 382/118 |
| 6,779,115 B1 ‡ | 8/2004 | Naim | ............... | G06F 21/10 380/278 |
| 6,792,533 B2 ‡ | 9/2004 | Jablon | ............... | H04L 9/0844 380/30 |
| 6,829,711 B1 ‡ | 12/2004 | Kwok | ............... | G06F 21/445 713/183 |
| 6,834,271 B1 ‡ | 12/2004 | Hodgson | ............... | G06Q 20/04 705/64 |
| 6,834,795 B1 ‡ | 12/2004 | Rasmussen | ............ | G06F 21/33 235/380 |
| 6,852,031 B1 ‡ | 2/2005 | Rowe | ............... | G07F 17/32 235/375 |
| 6,865,547 B1 ‡ | 3/2005 | Brake, Jr. | ............ | G06Q 40/025 705/41 |
| 6,873,260 B2 ‡ | 3/2005 | Lancos | ............... | G07C 9/28 340/573.1 |
| 6,877,656 B1 ‡ | 4/2005 | Jaros | ............... | G06Q 20/04 235/380 |
| 6,889,198 B2 ‡ | 5/2005 | Kawan | ............... | G06Q 20/105 705/14.27 |
| 6,905,411 B2 ‡ | 6/2005 | Nguyen | ............... | G07F 17/32 463/25 |
| 6,910,627 B1 ‡ | 6/2005 | Simpson-Young | ... | G07F 7/0886 235/381 |
| 6,971,031 B2 ‡ | 11/2005 | Haala | ............... | G07F 7/12 726/4 |
| 6,990,588 B1 ‡ | 1/2006 | Yasukura | ............... | G07C 9/257 713/186 |
| 7,006,986 B1 ‡ | 2/2006 | Sines | ............... | G06Q 20/382 705/26.35 |
| 7,085,931 B1 ‡ | 8/2006 | Smith | ............... | G06F 21/335 713/175 |
| 7,127,605 B1 ‡ | 10/2006 | Montgomery | .......... | G06F 21/53 713/150 |
| 7,128,274 B2 ‡ | 10/2006 | Kelley | ............... | G06Q 20/3278 235/492 |
| 7,140,550 B2 ‡ | 11/2006 | Ramachandran | ...... | G06K 19/08 235/493 |
| 7,152,045 B2 ‡ | 12/2006 | Hoffman | ............... | G06Q 20/40 705/43 |
| 7,165,727 B2 ‡ | 1/2007 | de Jong | ............... | H04W 4/50 235/492 |
| 7,175,076 B1 ‡ | 2/2007 | Block | ............... | G06Q 40/00 235/375 |
| 7,202,773 B1 ‡ | 4/2007 | Oba | ............... | G06F 21/34 340/5.8 |
| 7,206,806 B2 ‡ | 4/2007 | Pineau | ............... | H04L 29/06 709/203 |
| 7,232,073 B1 ‡ | 6/2007 | de Jong | ............... | G06F 9/445 235/382 |
| 7,246,752 B2 ‡ | 7/2007 | Brown | ............... | G06K 19/06187 235/380 |
| 7,254,569 B2 ‡ | 8/2007 | Goodman | ............... | G06F 40/174 |

(56) References Cited

U.S. PATENT DOCUMENTS

| | | | | |
|---|---|---|---|---|
| 7,263,507 B1 ‡ | 8/2007 | Brake, Jr. | G06Q 20/3572 | 705/41 |
| 7,270,276 B2 ‡ | 9/2007 | Vayssiere | G06K 19/07703 | 235/492 |
| 7,278,025 B2 ‡ | 10/2007 | Saito | G06F 21/32 | 713/185 |
| 7,287,692 B1 ‡ | 10/2007 | Patel | G06Q 20/10 | 235/379 |
| 7,290,709 B2 ‡ | 11/2007 | Tsai | G06K 7/084 | 235/449 |
| 7,306,143 B2 ‡ | 12/2007 | Bonneau, Jr. | G06Q 20/346 | 235/380 |
| 7,319,986 B2 ‡ | 1/2008 | Praisner | G06Q 20/10 | 705/39 |
| 7,325,132 B2 ‡ | 1/2008 | Takayama | G06Q 20/04 | 705/64 |
| 7,373,515 B2 ‡ | 5/2008 | Owen | G06F 21/31 | 713/182 |
| 7,374,099 B2 ‡ | 5/2008 | de Jong | G06Q 20/341 | 235/380 |
| 7,375,616 B2 ‡ | 5/2008 | Rowse | G06K 7/0008 | 340/10.1 |
| 7,380,710 B2 ‡ | 6/2008 | Brown | G06Q 20/105 | 235/380 |
| 7,424,977 B2 ‡ | 9/2008 | Smets | G01R 31/302 | 235/380 |
| 7,453,439 B1 ‡ | 11/2008 | Kushler | G06F 3/0237 | 345/168 |
| 7,472,829 B2 ‡ | 1/2009 | Brown | G06K 19/06206 | 235/380 |
| 7,487,357 B2 ‡ | 2/2009 | Smith | G06F 21/335 | 713/176 |
| 7,568,631 B2 ‡ | 8/2009 | Gibbs | G06Q 20/12 | 235/380 |
| 7,584,153 B2 ‡ | 9/2009 | Brown | G07F 7/1083 | 235/380 |
| 7,597,250 B2 ‡ | 10/2009 | Finn | G06K 19/07732 | 235/380 |
| 7,628,322 B2 ‡ | 12/2009 | Holtmanns | G06Q 20/3552 | 235/380 |
| 7,652,578 B2 ‡ | 1/2010 | Braun | G06K 19/0723 | 340/572.4 |
| 7,689,832 B2 ‡ | 3/2010 | Talmor | G06F 21/645 | 713/186 |
| 7,703,142 B1 ‡ | 4/2010 | Wilson | H04W 12/084 | 726/26 |
| 7,748,609 B2 ‡ | 7/2010 | Sachdeva | G06F 21/33 | 235/376 |
| 7,748,617 B2 ‡ | 7/2010 | Gray | G06Q 20/382 | 235/380 |
| 7,748,636 B2 ‡ | 7/2010 | Finn | H04B 5/0062 | 235/492 |
| 7,762,457 B2 ‡ | 7/2010 | Bonalle | G06Q 20/341 | 235/383 |
| 7,789,302 B2 ‡ | 9/2010 | Tame | G07F 7/1008 | 235/382 |
| 7,793,851 B2 ‡ | 9/2010 | Mullen | G06Q 20/40 | 235/493 |
| 7,796,013 B2 ‡ | 9/2010 | Murakami | G06K 9/00013 | 340/5.82 |
| 7,801,799 B1 ‡ | 9/2010 | Brake, Jr. | G06Q 40/04 | 705/37 |
| 7,801,829 B2 ‡ | 9/2010 | Gray | G06Q 20/3674 | 705/76 |
| 7,805,755 B2 ‡ | 9/2010 | Brown | G06F 21/52 | 726/10 |
| 7,809,643 B2 ‡ | 10/2010 | Phillips | G06Q 40/00 | 705/41 |
| 7,827,115 B2 ‡ | 11/2010 | Weller | G07F 7/1008 | 705/78 |
| 7,828,214 B2 ‡ | 11/2010 | Narendra | G06K 19/073 | 235/451 |
| 7,848,746 B2 ‡ | 12/2010 | Juels | H04L 9/0891 | 455/424 |
| 7,882,553 B2 ‡ | 2/2011 | Tuliani | G07C 9/22 | 726/9 |
| 7,900,048 B2 ‡ | 3/2011 | Andersson | G06F 8/60 | 713/175 |
| 7,908,216 B1 ‡ | 3/2011 | Davis | G06Q 20/10 | 705/41 |
| 7,922,082 B2 ‡ | 4/2011 | Muscato | G07F 7/1008 | 235/380 |
| 7,933,589 B1 ‡ | 4/2011 | Mamdani | G06Q 20/04 | 455/414.1 |
| 7,949,559 B2 ‡ | 5/2011 | Freiberg | G06Q 20/363 | 705/14.27 |
| 7,954,716 B2 ‡ | 6/2011 | Narendra | G06K 19/0723 | 235/451 |
| 7,954,723 B2 ‡ | 6/2011 | Charrat | H04L 45/54 | 235/492 |
| 7,962,369 B2 ‡ | 6/2011 | Rosenberg | G06Q 30/0601 | 705/26.1 |
| 7,993,197 B2 ‡ | 8/2011 | Kaminkow | G07F 17/3255 | 463/25 |
| 8,005,426 B2 ‡ | 8/2011 | Huomo | H04M 1/72412 | 455/41.2 |
| 8,010,405 B1 ‡ | 8/2011 | Bortolin | G06Q 30/0207 | 705/14.1 |
| RE42,762 E ‡ | 9/2011 | Shin | H04L 9/3271 | 713/159 |
| 8,041,954 B2 ‡ | 10/2011 | Plesman | H04L 9/3228 | 713/183 |
| 8,060,012 B2 ‡ | 11/2011 | Sklovsky | G06F 9/445 | 455/41.1 |
| 8,074,877 B2 ‡ | 12/2011 | Mullen | G06K 7/087 | 235/380 |
| 8,082,450 B2 ‡ | 12/2011 | Frey | H04L 9/3247 | 713/189 |
| 8,095,113 B2 ‡ | 1/2012 | Kean | G06F 21/31 | 455/410 |
| 8,099,332 B2 ‡ | 1/2012 | Lemay | G06F 3/04842 | 705/26.1 |
| 8,103,249 B2 ‡ | 1/2012 | Markison | G06K 9/2063 | 455/411 |
| 8,108,687 B2 ‡ | 1/2012 | Ellis | G06Q 40/00 | 713/189 |
| 8,127,143 B2 ‡ | 2/2012 | Abdallah | H04L 9/3231 | 713/186 |
| 8,135,648 B2 ‡ | 3/2012 | Oram | G07F 17/32 | 705/67 |
| 8,140,010 B2 ‡ | 3/2012 | Symons | H04B 5/0075 | 455/41.1 |
| 8,141,136 B2 ‡ | 3/2012 | Lee | H04W 8/205 | 726/6 |
| 8,150,321 B2 ‡ | 4/2012 | Winter | H04B 5/0068 | 455/41.2 |
| 8,150,767 B2 ‡ | 4/2012 | Wankmueller | G06Q 20/10 | 705/41 |
| 8,186,602 B2 ‡ | 5/2012 | Itay | G06F 9/445 | 235/492 |
| 8,196,131 B1 ‡ | 6/2012 | von Behren | G06Q 20/3563 | 717/168 |
| 8,215,563 B2 ‡ | 7/2012 | Levy | G06F 21/77 | 235/492 |
| 8,224,753 B2 ‡ | 7/2012 | Atef | G06F 21/34 | 705/64 |
| 8,232,879 B2 ‡ | 7/2012 | Davis | G06F 21/31 | 340/572.1 |
| 8,233,841 B2 ‡ | 7/2012 | Griffin | G06Q 20/3829 | 455/41.1 |
| 8,245,292 B2 ‡ | 8/2012 | Buer | G06F 21/34 | 726/20 |
| 8,249,654 B1 ‡ | 8/2012 | Zhu | H04M 17/20 | 455/558 |
| 8,266,451 B2 ‡ | 9/2012 | Leydier | G06Q 20/3415 | 713/193 |
| 8,285,329 B1 ‡ | 10/2012 | Zhu | G06Q 20/3223 | 455/558 |

(56) References Cited

U.S. PATENT DOCUMENTS

| | | | | |
|---|---|---|---|---|
| 8,302,872 | B2 ‡ | 11/2012 | Mullen | G06Q 30/0277 235/493 |
| 8,312,519 | B1 ‡ | 11/2012 | Bailey | H04L 9/3228 726/6 |
| 8,316,237 | B1 ‡ | 11/2012 | Felsher | H04L 9/0825 713/171 |
| 8,332,272 | B2 ‡ | 12/2012 | Fisher | G06Q 20/3674 705/16 |
| 8,365,988 | B1 ‡ | 2/2013 | Medina, III | G06Q 20/322 235/380 |
| 8,369,960 | B2 ‡ | 2/2013 | Tran | A61N 1/37217 607/60 |
| 8,371,501 | B1 ‡ | 2/2013 | Hopkins | G06F 21/32 235/380 |
| 8,381,307 | B2 ‡ | 2/2013 | Cimino | G06Q 20/3552 726/27 |
| 8,391,719 | B2 ‡ | 3/2013 | Alameh | H04W 8/186 398/118 |
| 8,417,231 | B2 ‡ | 4/2013 | Sanding | H04W 8/183 455/418 |
| 8,439,271 | B2 ‡ | 5/2013 | Smets | H04M 17/02 235/492 |
| 8,475,367 | B1 ‡ | 7/2013 | Yuen | A61B 5/02007 600/300 |
| 8,489,112 | B2 ‡ | 7/2013 | Roeding | H04W 4/021 455/456.1 |
| 8,511,542 | B2 ‡ | 8/2013 | Pan | G07F 19/207 235/379 |
| 8,559,872 | B2 ‡ | 10/2013 | Butler | H04B 5/0031 455/41.1 |
| 8,566,916 | B1 ‡ | 10/2013 | Vernon | H04L 63/0823 726/6 |
| 8,567,670 | B2 ‡ | 10/2013 | Stanfield | G06Q 20/3674 235/380 |
| 8,572,386 | B2 ‡ | 10/2013 | Takekawa | G06F 21/31 713/176 |
| 8,577,810 | B1 ‡ | 11/2013 | Dalit | G06Q 20/206 705/67 |
| 8,583,454 | B2 ‡ | 11/2013 | Beraja | G06Q 20/40145 705/2 |
| 8,589,335 | B2 ‡ | 11/2013 | Smith | G06Q 20/341 707/600 |
| 8,594,730 | B2 ‡ | 11/2013 | Bona | G06K 19/0719 455/558 |
| 8,615,468 | B2 ‡ | 12/2013 | Varadarajan | G06Q 20/40 705/44 |
| 8,620,218 | B2 ‡ | 12/2013 | Awad | H04W 4/80 455/41.2 |
| 8,667,285 | B2 ‡ | 3/2014 | Coulier | G06F 21/34 713/171 |
| 8,723,941 | B1 ‡ | 5/2014 | Shirbabadi | G07F 19/205 348/78 |
| 8,726,405 | B1 ‡ | 5/2014 | Bailey | G06F 21/6218 726/29 |
| 8,740,073 | B2 ‡ | 6/2014 | Vijayshankar | G06Q 20/3278 235/451 |
| 8,750,514 | B2 ‡ | 6/2014 | Gallo | H04L 61/00 380/271 |
| 8,752,189 | B2 ‡ | 6/2014 | de Jong | G06F 21/105 726/26 |
| 8,794,509 | B2 ‡ | 8/2014 | Bishop | G06Q 20/20 235/379 |
| 8,799,668 | B2 ‡ | 8/2014 | Cheng | H04L 9/3234 713/184 |
| 8,806,592 | B2 ‡ | 8/2014 | Ganesan | H04L 9/3228 726/6 |
| 8,807,440 | B1 ‡ | 8/2014 | von Behren | G06F 21/35 235/492 |
| 8,811,892 | B2 ‡ | 8/2014 | Khan | H04W 4/80 455/41.1 |
| 8,814,039 | B2 ‡ | 8/2014 | Bishop | G06Q 20/403 235/379 |
| 8,814,052 | B2 ‡ | 8/2014 | Bona | G06Q 20/34 235/492 |
| 8,818,867 | B2 ‡ | 8/2014 | Baldwin | G06Q 20/353 705/16 |
| 8,850,538 | B1 ‡ | 9/2014 | Vernon | H04L 9/003 726/6 |
| 8,861,733 | B2 ‡ | 10/2014 | Benteo | H04L 63/0876 380/270 |
| 8,880,027 | B1 ‡ | 11/2014 | Darringer | H04M 1/67 455/411 |
| 8,888,002 | B2 ‡ | 11/2014 | Marshall Chesney | G07C 9/27 235/382 |
| 8,898,088 | B2 ‡ | 11/2014 | Springer | G06Q 20/3278 705/65 |
| 8,934,837 | B2 ‡ | 1/2015 | Zhu | H04B 5/0087 455/41.1 |
| 8,977,569 | B2 ‡ | 3/2015 | Rao | G06K 19/07707 705/41 |
| 8,994,498 | B2 ‡ | 3/2015 | Agrafioti | A61B 5/318 340/5.82 |
| 9,004,365 | B2 ‡ | 4/2015 | Bona | H04L 9/3228 235/491 |
| 9,038,894 | B2 ‡ | 5/2015 | Khalid | G06Q 20/227 235/380 |
| 9,042,814 | B2 ‡ | 5/2015 | Royston | H04B 17/318 455/41.1 |
| 9,047,531 | B2 ‡ | 6/2015 | Showering | G06K 9/228 |
| 9,069,976 | B2 ‡ | 6/2015 | Toole | H04L 69/24 |
| 9,081,948 | B2 ‡ | 7/2015 | Magne | H04L 63/0853 |
| 9,104,853 | B2 ‡ | 8/2015 | Mathur | H04W 12/068 |
| 9,118,663 | B1 ‡ | 8/2015 | Bailey | H04L 63/0838 |
| 9,122,964 | B2 ‡ | 9/2015 | Krawczewicz | G06K 19/0701 |
| 9,129,280 | B2 ‡ | 9/2015 | Bona | G06Q 20/34 |
| 9,152,832 | B2 ‡ | 10/2015 | Royston | H04B 5/0031 |
| 9,203,800 | B2 ‡ | 12/2015 | Izu | H04L 9/0891 |
| 9,209,867 | B2 ‡ | 12/2015 | Royston | H04W 12/06 |
| 9,251,330 | B2 ‡ | 2/2016 | Boivie | G06K 19/06037 |
| 9,251,518 | B2 ‡ | 2/2016 | Levin | G06Q 30/0185 |
| 9,258,715 | B2 ‡ | 2/2016 | Borghei | H04W 12/08 |
| 9,270,337 | B2 ‡ | 2/2016 | Zhu | H04B 5/0087 |
| 9,306,626 | B2 ‡ | 4/2016 | Hall | H04B 5/00 |
| 9,306,942 | B1 ‡ | 4/2016 | Bailey | H04L 63/0838 |
| 9,324,066 | B2 ‡ | 4/2016 | Archer | G06Q 20/385 |
| 9,324,067 | B2 ‡ | 4/2016 | Van Os | G06Q 20/40 |
| 9,332,587 | B2 ‡ | 5/2016 | Salahshoor | H04W 84/20 |
| 9,338,622 | B2 ‡ | 5/2016 | Bjontegard | H04L 67/22 |
| 9,373,141 | B1 ‡ | 6/2016 | Shakkarwar | G06Q 20/351 |
| 9,379,841 | B2 * | 6/2016 | Fine | H04W 4/80 |
| 9,413,430 | B2 ‡ | 8/2016 | Royston | H04W 4/023 |
| 9,413,768 | B1 ‡ | 8/2016 | Gregg | G06F 21/44 |
| 9,420,496 | B1 ‡ | 8/2016 | Indurkar | H04W 4/50 |
| 9,426,132 | B1 ‡ | 8/2016 | Alikhani | G06F 21/44 |
| 9,432,339 | B1 ‡ | 8/2016 | Bowness | H04L 63/0838 |
| 9,455,968 | B1 ‡ | 9/2016 | Machani | G06Q 20/3821 |
| 9,473,509 | B2 ‡ | 10/2016 | Arsanjani | H04L 63/107 |
| 9,491,626 | B2 ‡ | 11/2016 | Sharma | H04W 12/12 |
| 9,553,637 | B2 ‡ | 1/2017 | Yang | H04B 5/0081 |
| 9,619,952 | B1 ‡ | 4/2017 | Zhao | G07C 9/00174 |
| 9,635,000 | B1 ‡ | 4/2017 | Muftic | H04L 9/3239 |
| 9,665,858 | B1 ‡ | 5/2017 | Kumar | G06Q 20/3224 |
| 9,674,705 | B2 ‡ | 6/2017 | Rose | H04W 12/033 |
| 9,679,286 | B2 ‡ | 6/2017 | Colnot | H04L 9/3271 |
| 9,680,942 | B2 ‡ | 6/2017 | Dimmick | H04W 12/06 |
| 9,710,804 | B2 ‡ | 7/2017 | Zhou | G06Q 20/385 |
| 9,740,342 | B2 ‡ | 8/2017 | Paulsen | G06F 3/041 |
| 9,740,988 | B1 ‡ | 8/2017 | Levin | G06Q 10/02 |
| 9,763,097 | B2 ‡ | 9/2017 | Robinson | H04W 4/021 |
| 9,767,329 | B2 ‡ | 9/2017 | Forster | G06K 19/07309 |
| 9,769,662 | B1 ‡ | 9/2017 | Queru | H04L 63/105 |
| 9,773,151 | B2 ‡ | 9/2017 | Mil'shtein | G06K 9/00919 |
| 9,780,953 | B2 ‡ | 10/2017 | Gaddam | H04L 63/0807 |
| 9,891,823 | B2 ‡ | 2/2018 | Feng | H04L 9/0866 |
| 9,940,571 | B1 ‡ | 4/2018 | Herrington | G06K 19/0772 |
| 9,953,323 | B2 ‡ | 4/2018 | Candelore | G06Q 20/40145 |
| 9,961,194 | B1 ‡ | 5/2018 | Wiechman | H04M 7/006 |
| 9,965,756 | B2 ‡ | 5/2018 | Davis | G06Q 20/326 |
| 9,965,911 | B2 ‡ | 5/2018 | Wishne | G07F 17/14 |
| 9,978,058 | B2 ‡ | 5/2018 | Wurmfeld | G06K 19/07722 |

(56) References Cited

U.S. PATENT DOCUMENTS

| | | | |
|---|---|---|---|
| 10,043,164 B2 ‡ | 8/2018 | Dogin | G06Q 30/00 |
| 10,075,437 B1 ‡ | 9/2018 | Costigan | H04L 63/0861 |
| 10,129,648 B1 ‡ | 11/2018 | Hernandez Santisteban | G11B 20/10527 |
| 10,133,979 B1 ‡ | 11/2018 | Eidam | G06K 19/145 |
| 10,217,105 B1 ‡ | 2/2019 | Sangi | G06K 19/0712 |
| 10,438,193 B2 * | 10/2019 | Zhang | G06Q 20/352 |
| 10,528,944 B2 ‡ | 1/2020 | Khan | H04W 12/068 |
| 11,551,200 B1 * | 1/2023 | Cook | H04L 9/3226 |
| 2001/0010723 A1 ‡ | 8/2001 | Pinkas | H04L 9/0894 380/286 |
| 2001/0029485 A1 ‡ | 10/2001 | Brody | G06Q 20/401 705/39 |
| 2001/0034702 A1 ‡ | 10/2001 | Mockett | G06Q 30/06 705/39 |
| 2001/0054003 A1 ‡ | 12/2001 | Chien | G06Q 20/10 705/14.17 |
| 2002/0078345 A1 ‡ | 6/2002 | Sandhu | H04L 9/321 713/155 |
| 2002/0093530 A1 ‡ | 7/2002 | Krothapalli | H04L 67/02 715/745 |
| 2002/0100808 A1 ‡ | 8/2002 | Norwood | G07C 9/23 235/486 |
| 2002/0120583 A1 ‡ | 8/2002 | Keresman, III | C07D 209/88 705/65 |
| 2002/0152116 A1 ‡ | 10/2002 | Yan | G06Q 20/10 705/14.14 |
| 2002/0153424 A1 ‡ | 10/2002 | Li | G06K 19/06206 235/492 |
| 2002/0165827 A1 ‡ | 11/2002 | Gien | G06Q 20/3829 705/64 |
| 2003/0023554 A1 ‡ | 1/2003 | Yap | G07F 7/1008 705/43 |
| 2003/0034873 A1 ‡ | 2/2003 | Chase | G07B 15/00 340/5.2 |
| 2003/0055727 A1 ‡ | 3/2003 | Walker | G06Q 30/0238 705/14.17 |
| 2003/0078882 A1 ‡ | 4/2003 | Sukeda | G06Q 20/10 705/39 |
| 2003/0167350 A1 ‡ | 9/2003 | Davis | G06F 9/468 719/316 |
| 2003/0208449 A1 ‡ | 11/2003 | Diao | G06Q 20/341 705/67 |
| 2004/0015958 A1 ‡ | 1/2004 | Veil | G06F 21/51 717/174 |
| 2004/0039919 A1 ‡ | 2/2004 | Takayama | G06Q 20/04 713/180 |
| 2004/0127256 A1 ‡ | 7/2004 | Goldthwaite | G06Q 20/02 455/558 |
| 2004/0215674 A1 ‡ | 10/2004 | Odinak | G06Q 20/3552 |
| 2004/0230799 A1 ‡ | 11/2004 | Davis | H04L 9/0662 713/169 |
| 2005/0044367 A1 ‡ | 2/2005 | Gasparini | G06F 21/121 713/172 |
| 2005/0075985 A1 ‡ | 4/2005 | Cartmell | G06Q 20/12 705/67 |
| 2005/0081038 A1 ‡ | 4/2005 | Arditti Modiano | H04L 9/3255 713/176 |
| 2005/0138387 A1 ‡ | 6/2005 | Lam | G06F 21/123 713/185 |
| 2005/0156026 A1 ‡ | 7/2005 | Ghosh | G07F 7/1008 235/380 |
| 2005/0160049 A1 ‡ | 7/2005 | Lundholm | G06F 21/10 705/59 |
| 2005/0195975 A1 ‡ | 9/2005 | Kawakita | H04L 9/0825 380/30 |
| 2005/0247797 A1 ‡ | 11/2005 | Ramachandran | G06Q 20/3276 235/492 |
| 2006/0006230 A1 ‡ | 1/2006 | Bear | H04L 63/083 235/435 |
| 2006/0040726 A1 ‡ | 2/2006 | Szrek | G06Q 20/341 463/17 |
| 2006/0041402 A1 ‡ | 2/2006 | Baker | G06K 19/07372 702/189 |
| 2006/0044153 A1 ‡ | 3/2006 | Dawidowsky | G06K 19/0723 340/4.3 |
| 2006/0047954 A1 ‡ | 3/2006 | Sachdeva | G06F 21/6218 713/165 |
| 2006/0085848 A1 ‡ | 4/2006 | Aissi | G06Q 20/40975 726/9 |
| 2006/0136334 A1 ‡ | 6/2006 | Atkinson | G07F 19/211 705/40 |
| 2006/0173985 A1 ‡ | 8/2006 | Moore | G06F 21/6254 709/223 |
| 2006/0174331 A1 ‡ | 8/2006 | Schuetz | G06F 21/33 726/5 |
| 2006/0208066 A1 * | 9/2006 | Finn | H04H 60/74 235/441 |
| 2006/0242698 A1 ‡ | 10/2006 | Inskeep | G06Q 20/385 726/20 |
| 2006/0280338 A1 ‡ | 12/2006 | Rabb | G09B 21/006 382/114 |
| 2007/0033642 A1 ‡ | 2/2007 | Ganesan | H04L 9/3247 726/10 |
| 2007/0055630 A1 ‡ | 3/2007 | Gauthier | G06Q 20/204 705/44 |
| 2007/0061266 A1 ‡ | 3/2007 | Moore | G16H 40/20 705/51 |
| 2007/0061487 A1 ‡ | 3/2007 | Moore | G06F 16/27 709/246 |
| 2007/0116292 A1 ‡ | 5/2007 | Kurita | H04L 9/3273 380/270 |
| 2007/0118745 A1 ‡ | 5/2007 | Buer | G06F 21/34 713/168 |
| 2007/0197261 A1 ‡ | 8/2007 | Humbel | G07C 9/00309 455/558 |
| 2007/0224969 A1 ‡ | 9/2007 | Rao | H04W 12/08 455/411 |
| 2007/0241182 A1 ‡ | 10/2007 | Buer | G06Q 20/40975 235/380 |
| 2007/0256134 A1 ‡ | 11/2007 | Lehtonen | G06Q 20/3552 726/26 |
| 2007/0258594 A1 ‡ | 11/2007 | Sandhu | H04L 9/3218 380/277 |
| 2007/0278291 A1 ‡ | 12/2007 | Rans | G07F 7/1008 235/380 |
| 2008/0008315 A1 ‡ | 1/2008 | Fontana | G06Q 20/341 380/44 |
| 2008/0011831 A1 ‡ | 1/2008 | Bonalle | G06K 19/07 235/380 |
| 2008/0014867 A1 ‡ | 1/2008 | Finn | H04B 5/0062 455/41.1 |
| 2008/0035738 A1 ‡ | 2/2008 | Mullen | G06Q 20/40 235/492 |
| 2008/0071681 A1 ‡ | 3/2008 | Khalid | G06Q 20/105 705/41 |
| 2008/0072303 A1 ‡ | 3/2008 | Syed | H04L 63/0838 726/10 |
| 2008/0086767 A1 ‡ | 4/2008 | Kulkarni | H04L 9/3215 726/9 |
| 2008/0103968 A1 ‡ | 5/2008 | Bies | G06Q 20/10 705/39 |
| 2008/0109309 A1 ‡ | 5/2008 | Landau | G09F 27/00 705/14.64 |
| 2008/0110983 A1 ‡ | 5/2008 | Ashfield | G06Q 20/40975 235/382 |
| 2008/0120711 A1 ‡ | 5/2008 | Dispensa | H04L 63/08 726/7 |
| 2008/0156873 A1 ‡ | 7/2008 | Wilhelm | G06Q 20/405 235/384 |
| 2008/0160984 A1 * | 7/2008 | Benes | H04M 1/72457 455/419 |
| 2008/0162312 A1 ‡ | 7/2008 | Sklovsky | G06Q 20/3278 705/35 |
| 2008/0164308 A1 ‡ | 7/2008 | Aaron | G06Q 20/34 235/380 |

(56) References Cited

U.S. PATENT DOCUMENTS

| | | | |
|---|---|---|---|
| 2008/0207307 A1‡ | 8/2008 | Cunningham, II | G07F 17/3251 463/25 |
| 2008/0209543 A1‡ | 8/2008 | Aaron | G06F 21/31 726/17 |
| 2008/0223918 A1‡ | 9/2008 | Williams | G06Q 20/342 235/379 |
| 2008/0285746 A1‡ | 11/2008 | Landrock | H04L 9/3247 380/29 |
| 2008/0308641 A1‡ | 12/2008 | Finn | G06K 19/07749 235/492 |
| 2009/0037275 A1‡ | 2/2009 | Pollio | G06Q 30/0235 705/14.26 |
| 2009/0048026 A1‡ | 2/2009 | French | G07F 17/3232 463/47 |
| 2009/0084862 A1* | 4/2009 | McCallum | E01B 23/06 238/12 |
| 2009/0132417 A1‡ | 5/2009 | Scipioni | G06Q 30/0603 705/44 |
| 2009/0143104 A1‡ | 6/2009 | Loh | G06Q 20/352 455/558 |
| 2009/0171682 A1‡ | 7/2009 | Dixon | G06Q 20/3278 705/346 |
| 2009/0210308 A1‡ | 8/2009 | Toomer | G06Q 20/32 705/16 |
| 2009/0235339 A1‡ | 9/2009 | Mennes | G06F 21/34 726/5 |
| 2009/0249077 A1‡ | 10/2009 | Gargaro | G06Q 20/382 713/183 |
| 2009/0282264 A1‡ | 11/2009 | Amiel | H04L 9/0861 713/189 |
| 2010/0023449 A1‡ | 1/2010 | Skowronek | G06Q 20/32 705/39 |
| 2010/0023455 A1‡ | 1/2010 | Dispensa | G06Q 10/02 705/44 |
| 2010/0029202 A1‡ | 2/2010 | Jolivet | G06K 7/0008 455/41.1 |
| 2010/0033310 A1‡ | 2/2010 | Narendra | G06K 19/07732 340/10.51 |
| 2010/0036769 A1‡ | 2/2010 | Winters | G06Q 20/102 705/40 |
| 2010/0078471 A1‡ | 4/2010 | Lin | G06Q 40/02 235/379 |
| 2010/0082491 A1‡ | 4/2010 | Rosenblatt | G06Q 10/02 705/65 |
| 2010/0094754 A1‡ | 4/2010 | Bertran | G06Q 20/40145 705/44 |
| 2010/0095130 A1‡ | 4/2010 | Bertran | G06Q 20/35765 713/189 |
| 2010/0100480 A1‡ | 4/2010 | Altman | G06Q 30/04 705/40 |
| 2010/0114731 A1‡ | 5/2010 | Kingston | G06Q 20/28 705/26.1 |
| 2010/0192230 A1‡ | 7/2010 | Steeves | G06Q 20/027 726/26 |
| 2010/0207742 A1‡ | 8/2010 | Buhot | H04B 5/06 340/10.51 |
| 2010/0211797 A1‡ | 8/2010 | Westerveld | H04N 7/165 713/185 |
| 2010/0240413 A1‡ | 9/2010 | He | G06F 16/1847 455/558 |
| 2010/0257357 A1‡ | 10/2010 | McClain | H04W 12/068 713/155 |
| 2010/0312634 A1‡ | 12/2010 | Cervenka | G06Q 30/06 705/14.38 |
| 2010/0312635 A1‡ | 12/2010 | Cervenka | G06Q 30/02 705/14.38 |
| 2011/0028160 A1‡ | 2/2011 | Roeding | H04W 4/02 455/456.1 |
| 2011/0035604 A1‡ | 2/2011 | Habraken | G06F 21/34 713/193 |
| 2011/0060631 A1‡ | 3/2011 | Grossman | G06Q 30/0238 705/14.13 |
| 2011/0068170 A1‡ | 3/2011 | Lehman | G06Q 30/0238 235/380 |
| 2011/0084132 A1‡ | 4/2011 | Tofighbakhsh | G16H 50/20 235/380 |
| 2011/0101093 A1‡ | 5/2011 | Ehrensvard | G06Q 20/12 235/380 |
| 2011/0113245 A1‡ | 5/2011 | Varadarajan | G06Q 20/385 713/168 |
| 2011/0125638 A1‡ | 5/2011 | Davis | G06Q 20/02 705/41 |
| 2011/0131415 A1‡ | 6/2011 | Schneider | H04L 63/0853 713/171 |
| 2011/0153437 A1‡ | 6/2011 | Archer | G06Q 20/3278 705/17 |
| 2011/0153496 A1‡ | 6/2011 | Royyuru | G06Q 20/12 705/44 |
| 2011/0208658 A1‡ | 8/2011 | Makhotin | G06Q 20/401 705/75 |
| 2011/0208965 A1‡ | 8/2011 | Machani | H04L 63/0435 713/168 |
| 2011/0211219 A1‡ | 9/2011 | Bradley | H04W 48/16 358/1.15 |
| 2011/0218911 A1‡ | 9/2011 | Spodak | G06Q 20/105 705/41 |
| 2011/0238564 A1‡ | 9/2011 | Lim | G06Q 20/3223 705/38 |
| 2011/0246780 A1‡ | 10/2011 | Yeap | H04L 9/3215 713/176 |
| 2011/0258452 A1‡ | 10/2011 | Coulier | H04L 9/3271 713/171 |
| 2011/0280406 A1‡ | 11/2011 | Ma | H04B 5/02 380/278 |
| 2011/0282785 A1‡ | 11/2011 | Chin | G06F 21/32 705/42 |
| 2011/0294418 A1‡ | 12/2011 | Chen | G06Q 20/3226 455/41.1 |
| 2011/0312271 A1‡ | 12/2011 | Ma | G06K 7/10237 455/41.1 |
| 2012/0024947 A1‡ | 2/2012 | Naelon | G06Q 20/20 235/380 |
| 2012/0030047 A1‡ | 2/2012 | Fuentes | G06Q 30/0601 705/26.1 |
| 2012/0030121 A1‡ | 2/2012 | Grellier | G06Q 20/3229 705/67 |
| 2012/0047071 A1‡ | 2/2012 | Mullen | G06Q 20/3278 705/44 |
| 2012/0079281 A1‡ | 3/2012 | Lowenstein | H04L 9/0618 713/189 |
| 2012/0109735 A1‡ | 5/2012 | Krawczewicz | G06K 19/07703 705/14.27 |
| 2012/0109764 A1‡ | 5/2012 | Martin | G06Q 20/204 705/17 |
| 2012/0143754 A1‡ | 6/2012 | Patel | G06Q 20/4018 705/41 |
| 2012/0150737 A1‡ | 6/2012 | Rottink | G06Q 20/3274 705/40 |
| 2012/0178366 A1‡ | 7/2012 | Levy | H04W 74/06 455/41.1 |
| 2012/0196583 A1‡ | 8/2012 | Kindo | H04M 1/6091 455/415 |
| 2012/0207305 A1‡ | 8/2012 | Gallo | H04W 4/80 380/271 |
| 2012/0209773 A1‡ | 8/2012 | Ranganathan | G06Q 20/3224 705/44 |
| 2012/0238206 A1‡ | 9/2012 | Singh | H04W 12/086 455/41.1 |
| 2012/0239560 A1‡ | 9/2012 | Pourfallah | G06Q 40/08 705/40 |
| 2012/0252350 A1‡ | 10/2012 | Steinmetz | H04K 3/415 455/1 |
| 2012/0254394 A1‡ | 10/2012 | Barras | H04L 67/34 709/223 |
| 2012/0284194 A1‡ | 11/2012 | Liu | G06Q 20/349 705/66 |

(56) References Cited

U.S. PATENT DOCUMENTS

| | | | | |
|---|---|---|---|---|
| 2012/0290472 A1‡ | 11/2012 | Mullen | G06Q 10/00 | 705/39 |
| 2012/0296818 A1‡ | 11/2012 | Nuzzi | G06Q 20/4012 | 705/41 |
| 2012/0316992 A1‡ | 12/2012 | Oborne | G06Q 20/386 | 705/26.41 |
| 2012/0317035 A1‡ | 12/2012 | Royyuru | G06Q 30/06 | 705/71 |
| 2012/0317628 A1‡ | 12/2012 | Yeager | G06Q 20/204 | 726/5 |
| 2013/0005245 A1‡ | 1/2013 | Royston | H02J 50/00 | 455/41.1 |
| 2013/0008956 A1‡ | 1/2013 | Ashfield | G06Q 20/24 | 235/380 |
| 2013/0026229 A1‡ | 1/2013 | Jarman | G06Q 20/20 | 235/380 |
| 2013/0048713 A1‡ | 2/2013 | Pan | G07F 19/207 | 235/379 |
| 2013/0054474 A1‡ | 2/2013 | Yeager | G06Q 20/02 | 705/71 |
| 2013/0065564 A1‡ | 3/2013 | Conner | G06K 19/0718 | 455/414.1 |
| 2013/0080228 A1‡ | 3/2013 | Fisher | G06Q 20/3255 | 705/14.23 |
| 2013/0080229 A1‡ | 3/2013 | Fisher | G06Q 20/326 | 705/14.23 |
| 2013/0099587 A1‡ | 4/2013 | Lou | H02J 3/381 | 307/104 |
| 2013/0104251 A1‡ | 4/2013 | Moore | G06F 21/602 | 726/30 |
| 2013/0106576 A1‡ | 5/2013 | Hinman | H04K 3/822 | 340/10.1 |
| 2013/0119130 A1‡ | 5/2013 | Braams | G06Q 20/4012 | 235/382 |
| 2013/0130614 A1‡ | 5/2013 | Busch-Sorensen | G06K 7/10287 | 455/1 |
| 2013/0144793 A1‡ | 6/2013 | Royston | G06Q 20/352 | 705/72 |
| 2013/0171929 A1‡ | 7/2013 | Adams | H04W 4/80 | 455/41.1 |
| 2013/0179351 A1‡ | 7/2013 | Wallner | G07F 7/088 | 705/71 |
| 2013/0185772 A1‡ | 7/2013 | Jaudon | H04L 67/38 | 726/4 |
| 2013/0191279 A1‡ | 7/2013 | Calman | G06Q 20/3227 | 705/41 |
| 2013/0200999 A1* | 8/2013 | Spodak | G16H 10/65 | 340/5.65 |
| 2013/0216108 A1‡ | 8/2013 | Hwang | G06K 9/00926 | 382/118 |
| 2013/0221094 A1* | 8/2013 | Smith | G07C 9/00309 | 235/382 |
| 2013/0226791 A1‡ | 8/2013 | Springer | G06Q 40/12 | 705/41 |
| 2013/0226796 A1‡ | 8/2013 | Jiang | G06Q 20/3825 | 705/44 |
| 2013/0232082 A1‡ | 9/2013 | Krawczewicz | G16H 10/60 | 705/55 |
| 2013/0238894 A1‡ | 9/2013 | Ferg | H04L 9/321 | 713/155 |
| 2013/0282360 A1‡ | 10/2013 | Shimota | G06F 40/58 | 704/7 |
| 2013/0303085 A1‡ | 11/2013 | Boucher | H04W 4/80 | 455/41.1 |
| 2013/0304651 A1‡ | 11/2013 | Smith | H04W 12/35 | 705/67 |
| 2013/0312082 A1‡ | 11/2013 | Izu | H04L 63/02 | 726/13 |
| 2013/0314593 A1‡ | 11/2013 | Reznik | H04N 1/19594 | 348/373 |
| 2013/0320080 A1‡ | 12/2013 | Olson | G07F 7/0833 | 235/380 |
| 2013/0344857 A1‡ | 12/2013 | Berionne | H04W 88/02 | 455/418 |
| 2014/0002238 A1‡ | 1/2014 | Taveau | G07C 9/257 | 340/5.53 |
| 2014/0019352 A1‡ | 1/2014 | Shrivastava | G06Q 20/326 | 705/41 |
| 2014/0027506 A1‡ | 1/2014 | Heo | G06K 19/0725 | 235/380 |
| 2014/0032409 A1‡ | 1/2014 | Rosano | G06Q 20/409 | 705/44 |
| 2014/0032410 A1‡ | 1/2014 | Georgiev | G06Q 20/405 | 705/44 |
| 2014/0040120 A1‡ | 2/2014 | Cho | G06Q 20/3278 | 705/39 |
| 2014/0040139 A1‡ | 2/2014 | Brudnicki | H04W 12/0471 | 705/44 |
| 2014/0040147 A1‡ | 2/2014 | Varadarajan | G06Q 20/3823 | 705/71 |
| 2014/0047235 A1‡ | 2/2014 | Lessiak | H04W 12/04 | 713/164 |
| 2014/0067690 A1‡ | 3/2014 | Pitroda | G06Q 20/367 | 705/71 |
| 2014/0074637 A1‡ | 3/2014 | Hammad | G06Q 20/3227 | 705/21 |
| 2014/0074655 A1‡ | 3/2014 | Lim | G06Q 20/387 | 705/26.35 |
| 2014/0081720 A1‡ | 3/2014 | Wu | G06Q 20/20 | 705/14.1 |
| 2014/0138435 A1‡ | 5/2014 | Khalid | G06Q 20/352 | 235/380 |
| 2014/0171034 A1‡ | 6/2014 | Aleksin | H04M 1/72403 | 455/414.1 |
| 2014/0171039 A1‡ | 6/2014 | Bjontegard | H04L 67/38 | 455/414.1 |
| 2014/0172700 A1‡ | 6/2014 | Teuwen | G06Q 20/3226 | 705/41 |
| 2014/0180851 A1‡ | 6/2014 | Fisher | H04W 4/023 | 705/16 |
| 2014/0208112 A1‡ | 7/2014 | McDonald | G06F 21/41 | 713/171 |
| 2014/0214674 A1‡ | 7/2014 | Narula | G07F 7/084 | 705/44 |
| 2014/0229375 A1‡ | 8/2014 | Zaytzsev | G06Q 20/382 | 705/44 |
| 2014/0245391 A1‡ | 8/2014 | Adenuga | G06Q 20/3224 | 726/3 |
| 2014/0256251 A1‡ | 9/2014 | Caceres | H04W 12/084 | 455/41.1 |
| 2014/0258099 A1‡ | 9/2014 | Rosano | G06Q 20/409 | 705/39 |
| 2014/0258113 A1‡ | 9/2014 | Gauthier | G06Q 20/204 | 705/41 |
| 2014/0258125 A1‡ | 9/2014 | Gerber | G06Q 20/40 | 705/44 |
| 2014/0274179 A1‡ | 9/2014 | Zhu | H04W 52/243 | 455/509 |
| 2014/0279479 A1‡ | 9/2014 | Maniar | G06Q 20/204 | 705/41 |
| 2014/0337235 A1‡ | 11/2014 | Van Heerden | G06Q 20/383 | 705/71 |
| 2014/0339315 A1‡ | 11/2014 | Ko | G06Q 20/3227 | 235/492 |
| 2014/0346860 A1‡ | 11/2014 | Aubry | H02J 50/80 | 307/9.1 |
| 2014/0365780 A1‡ | 12/2014 | Movassaghi | H04W 4/50 | 713/184 |
| 2014/0379361 A1‡ | 12/2014 | Mahadkar | G06Q 10/10 | 705/2 |
| 2015/0012444 A1‡ | 1/2015 | Brown | H04L 63/08 | 705/76 |
| 2015/0032635 A1‡ | 1/2015 | Guise | G06Q 20/40145 | 705/72 |
| 2015/0071486 A1‡ | 3/2015 | Rhoads | G07F 7/0813 | 382/100 |

(56) References Cited

U.S. PATENT DOCUMENTS

| | | | |
|---|---|---|---|
| 2015/0088757 A1‡ | 3/2015 | Zhou | G06Q 20/321 705/71 |
| 2015/0089586 A1‡ | 3/2015 | Ballesteros | H04W 4/80 726/3 |
| 2015/0134452 A1‡ | 5/2015 | Williams | G06Q 30/0257 705/14.55 |
| 2015/0140960 A1‡ | 5/2015 | Powell | G06Q 20/322 455/406 |
| 2015/0154595 A1‡ | 6/2015 | Collinge | H04L 63/062 705/71 |
| 2015/0170138 A1‡ | 6/2015 | Rao | G06Q 20/4012 705/41 |
| 2015/0178724 A1‡ | 6/2015 | Ngo | G06Q 20/327 705/71 |
| 2015/0186871 A1‡ | 7/2015 | Laracey | G06Q 30/06 705/41 |
| 2015/0205379 A1‡ | 7/2015 | Mag | G06F 3/0346 345/156 |
| 2015/0302409 A1‡ | 10/2015 | Malek | G06Q 20/385 705/44 |
| 2015/0317626 A1‡ | 11/2015 | Ran | G06Q 20/202 705/76 |
| 2015/0332266 A1‡ | 11/2015 | Friedlander | G06Q 20/3274 705/75 |
| 2015/0339474 A1‡ | 11/2015 | Paz | G06F 21/35 713/185 |
| 2015/0371234 A1‡ | 12/2015 | Huang | G06Q 20/20 705/44 |
| 2016/0012465 A1‡ | 1/2016 | Sharp | G06Q 20/386 705/14.17 |
| 2016/0026997 A1‡ | 1/2016 | Tsui | G06Q 20/40145 705/75 |
| 2016/0048913 A1‡ | 2/2016 | Rausaria | G06Q 40/02 705/39 |
| 2016/0055480 A1‡ | 2/2016 | Shah | G06Q 20/36 705/21 |
| 2016/0057619 A1‡ | 2/2016 | Lopez | G06F 9/455 380/247 |
| 2016/0065370 A1‡ | 3/2016 | Le Saint | H04L 9/0841 713/155 |
| 2016/0087957 A1‡ | 3/2016 | Shah | H04L 63/08 726/1 |
| 2016/0092696 A1‡ | 3/2016 | Guglani | G06F 21/335 726/26 |
| 2016/0148193 A1‡ | 5/2016 | Kelley | G06K 19/0723 235/380 |
| 2016/0232523 A1‡ | 8/2016 | Venot | G06Q 20/3223 |
| 2016/0239672 A1‡ | 8/2016 | Khan | G09C 5/00 |
| 2016/0253651 A1‡ | 9/2016 | Park | G07F 9/023 705/39 |
| 2016/0255072 A1‡ | 9/2016 | Liu | G06Q 20/3272 726/4 |
| 2016/0267486 A1‡ | 9/2016 | Mitra | H04W 12/041 |
| 2016/0277383 A1‡ | 9/2016 | Guyomarc'h | H04L 63/083 |
| 2016/0277388 A1‡ | 9/2016 | Lowe | H04L 63/083 |
| 2016/0307187 A1‡ | 10/2016 | Guo | G06K 19/0705 |
| 2016/0307189 A1‡ | 10/2016 | Zarakas | G06K 19/07722 |
| 2016/0314472 A1‡ | 10/2016 | Ashfield | G06Q 20/4018 |
| 2016/0330027 A1‡ | 11/2016 | Ebrahimi | G06F 21/34 |
| 2016/0335531 A1‡ | 11/2016 | Mullen | G06K 19/06112 |
| 2016/0379217 A1‡ | 12/2016 | Hammad | G06Q 20/4018 705/75 |
| 2017/0004502 A1‡ | 1/2017 | Quentin | G06Q 40/02 |
| 2017/0011395 A1‡ | 1/2017 | Pillai | G06Q 20/3278 |
| 2017/0011406 A1‡ | 1/2017 | Tunnell | H04W 12/06 |
| 2017/0017957 A1‡ | 1/2017 | Radu | G06Q 20/36 |
| 2017/0017964 A1‡ | 1/2017 | Janefalkar | G06Q 30/016 |
| 2017/0024716 A1‡ | 1/2017 | Jiam | G06Q 30/02 |
| 2017/0039566 A1‡ | 2/2017 | Schipperheijn | G06Q 20/405 |
| 2017/0041759 A1‡ | 2/2017 | Gantert | H04W 4/029 |
| 2017/0053273 A1* | 2/2017 | Jeong | G06Q 20/401 |
| 2017/0068950 A1‡ | 3/2017 | Kwon | G06Q 20/24 |
| 2017/0103388 A1‡ | 4/2017 | Pillai | G06Q 20/3823 |
| 2017/0104739 A1‡ | 4/2017 | Lansler | H04L 63/0838 |
| 2017/0109509 A1‡ | 4/2017 | Baghdasaryan | G06F 21/316 |
| 2017/0109730 A1‡ | 4/2017 | Locke | G06K 19/0717 |
| 2017/0116447 A1‡ | 4/2017 | Cimino | H04L 9/0631 |
| 2017/0124568 A1‡ | 5/2017 | Moghadam | G06K 7/10366 |
| 2017/0140379 A1‡ | 5/2017 | Deck | G06Q 20/34 |
| 2017/0154328 A1‡ | 6/2017 | Zarakas | G06Q 20/204 |
| 2017/0154333 A1‡ | 6/2017 | Gleeson | G06Q 20/027 |
| 2017/0180134 A1‡ | 6/2017 | King | H04L 63/0853 |
| 2017/0213218 A1‡ | 7/2017 | Pickering | G06Q 20/341 |
| 2017/0221047 A1‡ | 8/2017 | Veerasangappa Kadi | G06Q 20/352 |
| 2017/0230189 A1‡ | 8/2017 | Toll | H04L 9/3247 |
| 2017/0237301 A1‡ | 8/2017 | Elad | H02J 7/025 307/104 |
| 2017/0289127 A1‡ | 10/2017 | Hendrick | H04W 12/068 |
| 2017/0295013 A1‡ | 10/2017 | Claes | H04L 9/3226 |
| 2017/0303119 A1* | 10/2017 | Ogura | H04W 12/03 |
| 2017/0316696 A1‡ | 11/2017 | Bartel | B60W 50/0098 |
| 2017/0317834 A1‡ | 11/2017 | Smith | G06Q 20/065 |
| 2017/0330173 A1‡ | 11/2017 | Woo | G06K 19/07354 |
| 2017/0374070 A1‡ | 12/2017 | Shah | H04L 63/105 |
| 2018/0034507 A1‡ | 2/2018 | Wobak | H04B 5/0056 |
| 2018/0039986 A1‡ | 2/2018 | Essebag | G06Q 20/346 |
| 2018/0068316 A1‡ | 3/2018 | Essebag | G06Q 20/4018 |
| 2018/0129945 A1‡ | 5/2018 | Saxena | G06Q 20/02 |
| 2018/0160255 A1‡ | 6/2018 | Park | H04L 63/0492 |
| 2018/0191501 A1‡ | 7/2018 | Lindemann | G06F 3/0647 |
| 2018/0205712 A1‡ | 7/2018 | Versteeg | H04L 9/3247 |
| 2018/0240106 A1‡ | 8/2018 | Garrett | G06Q 20/40145 |
| 2018/0254909 A1‡ | 9/2018 | Hancock | H04L 9/3213 |
| 2018/0268132 A1‡ | 9/2018 | Buer | G06F 21/76 |
| 2018/0270214 A1‡ | 9/2018 | Caterino | H04W 12/062 |
| 2018/0294959 A1‡ | 10/2018 | Traynor | H04W 12/06 |
| 2018/0300716 A1‡ | 10/2018 | Carlson | G06Q 20/04 |
| 2018/0302396 A1‡ | 10/2018 | Camenisch | H04L 9/30 |
| 2018/0315050 A1‡ | 11/2018 | Hammad | G06Q 20/20 |
| 2018/0316666 A1‡ | 11/2018 | Koved | H04L 63/061 |
| 2018/0322486 A1‡ | 11/2018 | Deliwala | G06Q 20/385 |
| 2018/0359100 A1‡ | 12/2018 | Gaddam | H04L 9/3263 |
| 2019/0014107 A1‡ | 1/2019 | George | H04L 63/0838 |
| 2019/0019375 A1‡ | 1/2019 | Foley | A63F 3/00157 |
| 2019/0036678 A1‡ | 1/2019 | Ahmed | H04L 9/302 |
| 2019/0188414 A1 | 6/2019 | Guglani | |
| 2019/0238517 A1‡ | 8/2019 | D'Agostino | H04L 63/0807 |
| 2019/0392416 A1‡ | 12/2019 | Bernholc | G06K 7/10316 |
| 2020/0184482 A1* | 6/2020 | Sharma | G06Q 20/40145 |
| 2020/0387904 A1* | 12/2020 | Gosalia | G06Q 20/4014 |

FOREIGN PATENT DOCUMENTS

| | | | |
|---|---|---|---|
| CN | 103023643 | ‡ | 4/2013 |
| CN | 103417202 | ‡ | 12/2013 |
| EP | 1 085 424 | ‡ | 3/2001 |
| EP | 1 223 565 | ‡ | 7/2002 |
| EP | 1 265 186 | ‡ | 12/2002 |
| EP | 1 469 419 | ‡ | 10/2004 |
| EP | 1 783 919 | ‡ | 5/2007 |
| EP | 2 139 196 | ‡ | 12/2009 |
| EP | 2 852 070 | ‡ | 3/2015 |
| GB | 2 457 221 | ‡ | 8/2009 |
| GB | 2 516 861 | ‡ | 2/2015 |
| GB | 2 551 907 | ‡ | 1/2018 |
| KR | 101508320 | ‡ | 4/2015 |
| WO | WO 00/49586 | ‡ | 8/2000 |
| WO | WO 2006070189 | ‡ | 7/2006 |
| WO | WO 2008055170 | ‡ | 5/2008 |
| WO | WO 2009025605 | ‡ | 2/2009 |
| WO | WO 2010049252 | ‡ | 5/2010 |
| WO | WO 2011112158 | ‡ | 9/2011 |
| WO | WO 2012001624 | ‡ | 1/2012 |
| WO | WO 2013039395 | ‡ | 3/2013 |
| WO | WO 2013155562 | ‡ | 10/2013 |
| WO | WO 2013192358 | ‡ | 12/2013 |
| WO | WO 2014043278 | ‡ | 3/2014 |
| WO | WO 2014170741 | ‡ | 10/2014 |
| WO | WO 2015179649 | ‡ | 11/2015 |
| WO | WO 2015183818 | ‡ | 12/2015 |
| WO | WO 2016097718 | ‡ | 6/2016 |

(56) References Cited

FOREIGN PATENT DOCUMENTS

| WO | WO 2016160816 | ‡ | 10/2016 |
| WO | WO 2016168394 | ‡ | 10/2016 |
| WO | WO 2017042375 | ‡ | 3/2017 |
| WO | WO 2017042400 | ‡ | 3/2017 |
| WO | WO 2017157859 | ‡ | 9/2017 |
| WO | WO 2017208063 | ‡ | 12/2017 |
| WO | WO 2018063809 | ‡ | 4/2018 |
| WO | WO 2018137888 | ‡ | 8/2018 |

OTHER PUBLICATIONS

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.‡

Van den Breekel, J., et al., "EMV in a nutshell", Technical Report, 2016 [retrieved on Mar. 25, 2019]. Retrieved from Internet URL: https://wlw.cs.ru.nl/E.Poll/papers/EMVtechreport.pdf, 37 pages.‡

Author Unknown, "Autofill", Computer Hope [online] 2018 [retrieved on Mar. 25, 2019]. Retrieved from Internet URL: https://ww.computerhope.com/jargon/a/autofill.htm, 2 pages.‡

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.‡

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.‡

Berg, Guy, "Fundamentals of EMV" Smart Card Alliance [online] date unknown [retrieved on Mar. 27, 2019]. Retrieved from Internet URL: https://www.securetechalliance.org/resources/media/scap3_pre-conference/02.pdf, 37 pages.‡

Pierce, Kevin, "Is the amazon echo NFC compatible,?" Amazon.com Customer Q&A [online] 2016 [retrieved on Mar. 26, 2019]. Retrieved from Internet URL: https://wv.amazon.com/ask/questions/Tx1RJXYSPE6XLJD?_encodi . . . , 2 pages.‡

Author Unknown, "Triple DES", Wikipedia [online] 2018 [retrieved on Mar. 25, 2019]. Retrieved from Internet URL: https://simple.wvikipedia.org/wiki/TripleDES, 2 pages.‡

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.‡

Author unknown: "onetappaymentTM", [online] Jan. 24, 2019, [retrieved on Mar. 25, 2019]. Retrieved from Internet URL: https://ww.payubiz.in/onetap, 4 pages.‡

Vu et al., (2012). "Distinguishing users with capacitive touch communication" Proceedings of the Annual International Conference on Mobile Computing and Networking, MOBICOM. 10.1145/2348543.2348569.‡

EMVCo, EMV Card Personalization Specification, version 1.0 (Jun. 2003), 81 pages.‡

Ulhann et al., (2012). "On-Card User Authentication for Contactless Smart Cards based on Gesture Recognition", LNI, 223-234, 12 pages.‡

Faraj et al. (2008). "Investigation of Java Smart Card Technology for Multi-Task Applications" J. of Al-Anbar University for Pure Science, vol. 2: No. 1: 2008, 11 pages.‡

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.‡

Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.‡

Davison, A., et al., "MonoSLAM: Real-Time Single Camera SLAM", IEEE Transactions on Pattern Analysis and Machine Intelligence 29(6): 1052-1067 (2007).‡

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.‡

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrwl 103/mac, 3 pages.‡

Menghin, M.J., "Power Optimization Techniques for Near Field Communication Systems" 2014 Dissertation at Technical University of Graz [online]. Retrieved from Internet URL: https://diglib.ttgraz.at/download.php?id=576a7b910d2d6&location=browse, 135 pages.‡

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.‡

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, Il pages.‡

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.‡

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.‡

Profis, S., "Everything you need to know about NFC and mobile payments" CNET Directory [online], 2014 [retrieved on Mar. 25, 2019]. Retrieved from the Internet URL: https://wwv.cnet.com/how-to/how-nfc-works-and-mobile-payments/, 6 pages.‡

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.‡

Katz, J., and Lindell, Y., "Aggregate Message Authentication Codes", Topics in Cryptology [online] 2008 [retrieved on Mar. 25, 2019]. Retrieved from Internet URL: https://xvww.cs.umd.edu/~jkatz/papers/aggregateMAC.pdf, 11 pages.‡

A dams, D., and Maier, A-K, "Goldbug Big Seven open source crypto-messengers to be compared—: or Comprehensive Confidentiality Review & Audit of GoldBug Encrypting E-Mail-Client & Secure InstantMessenger", Big Seven Study 2016 [online] [retrieved on Mar. 25, 2018]. Retrieved from Internet URL: https://sf.net/projects/goldbug/files/bigseven-crypto-audit.pdf, 309 pages.‡

Author Unknown, "Multiple encryption", Wikipedia [online] 2019 [retrieved on Mar. 25, 2019]. Retrieved from Internet URL: https://en.wikipedia.org/wiki/Multipleencryption, 4 pages.‡

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.‡

Author Unknown, "Add Account Updater to your recurring payment tool," [online] 2018-2019 [retrieved on Mar. 25, 2019]. Retrieved from Internet URL: https://www.authorize.net/our-featutres/account-updater/, 5 pages.‡

Author Unknown, "Visa® Account Updater for Merchants," [online] 2019 [retrieved on Mar. 25, 2019]. Retrieved from Internet URL: https://usa.visa.com/dam/VCOM/downloadl/merchants/visa-account-updater-product-information-fact-sheet-for-merchants.pdf, 2 pages.‡

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.‡

Author Unknown, "Contactless Specifications for Payment Systems," EMV Book B—Entry Point Specification [online] 2016 [retrieved on Mar. 25, 2019]. Retrieved from Internet URL: https://

(56) References Cited

OTHER PUBLICATIONS www.emvco.com/xvp- content/uploads/2017/05/BookB_Entry_PointSpecificationv2_6_20160809023257319.pdf, 52 pages.‡
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_KeyManagement_20120607061923900.pdf, 174 pages.‡
Lehpamer, Harvey, "Component of the RFID System," RFID Design Principles, 2nd edition pp. 133-201 (2012).‡
Pourghomi, Pardis et al., "A Proposed NFC Payment Application," International Journal of Advanced Computer Science and Applications, vol. 4, No. 8, 2013.‡
Author Unknown, "CardrefresherSM from American Express®," [online] 2019 [retrieved on Mar. 25, 2019]. Retrieved from Internet URL: https://merchant-channel.americanexpress.com/merchant/enUS/cardrefresher, 2 pages.‡
Batina, Lejla and Poll, Erik, "SmartCards and RFID", Course PowerPoint Presentation for IPA Security Course, Digital Security at University of Nijmegen, Netherlands (date unknown) 75 pages.‡
Haykin M. and Warnar, R., "Smart Card Technology: New Methods for Computer Access Control," Computer Science and Technology NIST Special Publication 500-157:1-60 (1988).‡
Author Unknown, "Add Account Updater to your recurring payment tool," [online] 2018-2019 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-pay ments/, 6 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Author unknown: "onetappayment™", [online] Jan. 24, 2019, [retrieved on Mar. 25, 2019]. Retrieved from Internet URL: https://www.payubiz.in/onetap, 4 pages.
Ullmann et al., (2012). "On-Card User Authentication for Contactless Smart Cards based on Gesture Recognition", LNI, 223-234, 12 pages.
Notification Concerning Transmittal of International Preliminary Report on Patentability from related PCT Application No. PCT/US2021/029277 mailed Aug. 2, 2021.
Notification Concerning Transmittal of International Preliminary Report on Patentability from related PCT Application No. PCT/US2021/029277, mailed Nov. 10, 2022.

\* cited by examiner
‡ imported from a related application

System 800

SYSTEMS AND METHODS FOR DATA ACCESS CONTROL OF PERSONAL USER DATA USING A SHORT-RANGE TRANSCEIVER

CROSS-REFERENCE TO RELATED APPLICATION

The subject application is a Continuation of Ser. No. 16/863,750 filed Apr. 30, 2020, the disclosure of which is incorporated herein by reference in its entirety.

FIELD OF THE DISCLOSURE

The present disclosure relates generally to user data control and, more specifically, to exemplary systems and methods for active control of access to personal user data through the interaction of a short-range transceiver with a client device.

BACKGROUND

A typical user has personal user information or data that may be of a sensitive or confidential nature, including, for example, such information as personal health data, social security number, family contacts, etc. When a user creates an account, the user will generally provide a certain amount of personal, identifying information regarding the user, as well as information for account access such as a username and password. Entities other than the user may add to the personal user data. Different entities may have, for example, different user data retention policies, different use policies, and different user data sharing policies. The policies of using user-information may further change without any notification to the user. In addition, the possessor of the user information may also change through a merger or buy-out of one entity by another, many times without any notice to the user.

Account access will often rely on log-in credentials (e.g., username and password) to confirm a cardholder's identity. However, if the log-in credentials are compromised, another person could have access to the user's account and, potentially, to the user's sensitive or confidential information or data. In addition, the more entities or individuals that a user shares their personal information with, the greater the risk of the user's information being stolen by a breach at one of the entities. Further, a user may only desire to share certain pieces of personal information with an entity or individual for limited purposes or limited in time.

Thus, it may be beneficial to provide exemplary systems and methods which allow users to control the use of user information to overcome at least some of the deficiencies described herein.

SUMMARY

Aspects of the disclosed technology include systems and methods for controlling data access through the interaction of a short-range transceiver, such as a contactless card, with a client device. Data access control may be provided in the context of personal user data, including handling requests to obtain access to personal user data via the interaction of a short-range transceiver, such as a contactless card, with a client device such that the personal user data is only provided to service providers who are authorized to review the data and disclosure of certain account identifier information, or account login information, need not be disclosed to service providers requesting access to personal user data.

Embodiments of the present disclosure provide a data access control system, comprising: a database storing information comprising a user identifier and a user key associated with a user, and a service provider identifier and a service provider key associated with a service provider; a server configured for data communication with a client device associated with the service provider; a contactless card associated with the user, the contactless card comprising a communications interface, a processor, and a memory, the memory storing an applet, a user token, and personal user data associated with the user, wherein the personal user data is encrypted using the user key; a client application comprising instructions for execution on the client device, the client application configured to: in response to a tap action between the contactless card and the client device: receive the user token from the contactless card, and transmit to the server a service provider token, the user token, and a request for a data access key, wherein the service provider token is associated with the service provider; receive from the server the data access key; receive from the contactless card the encrypted personal user data; and using the data access key, decrypt the encrypted personal user data; and, a processor in data communication with the server and the database, the processor configured to: receive from the client device the service provider token, the user token, and the request for the data access key; identify the service provider based on the service provider token; identify the user based on the user token; verify that the service provider is authorized to receive access to the personal user data; and transmit to the client device the data access key.

Embodiments of the present disclosure provide a method for controlling data access, comprising: establishing a database storing information comprising a user identifier and a user key associated with a user, and a service provider identifier and a first service provider key associated with a service provider; receiving from a first client device associated with the service provider, via a network, a service provider token and a request for a data access key to access personal user data stored on a contactless card associated with the user, the personal user data encrypted using the user key, the request generated in response to a tap action between the contactless card and the first client device, the request accompanied by a user token stored on the contactless card; identifying the service provider based on the service provider token; identifying the user based on the user token; verifying that the service provider is authorized to receive access to personal user data stored on the contactless card; generating the data access key based on the user key; and transmitting to the first client device the data access key.

Embodiments of the present disclosure provide a method for controlling data access, comprising: establishing a database storing information comprising a user identifier and a user key associated with a user, and a service provider identifier and a service provider key associated with a service provider; providing a contactless card comprising a communications interface, a processor, and a memory, the memory storing an applet and a user token, wherein the communications interface is configured to support at least one of near field communication, Bluetooth, or Wi-Fi, and wherein the contactless card is associated with the user; providing a client application comprising instructions for execution on a client device associated with the service provider, the client application configured to: in response to a tap action between the contactless card and the client device: receive the user token from the contactless card, and transmit, to a server, a service provider token, the user token, and a request for a data access key, wherein the service provider token is associated with the service provider; receive from the server the data access key and a link to a data repository storing encrypted personal user data associated with the user, wherein the data access key is generated based on the user key; transmit to the data repository, via the link, a request for the encrypted personal user data; receive from the data repository the encrypted personal user data; and using the data access key, decrypt the encrypted personal user data; receiving from the client device, via a network, a service provider token and the request for the data access key to access the personal user data associated with the user, the request accompanied by the user token; identifying the service provider based on the service provider token; identifying the user based on the user token; verifying that the service provider is authorized to receive access to the personal user data associated with the user; generating the link to the data repository storing the encrypted personal user data; generating the data access key based on the user key; and transmitting to the client device the data access key and the link to the data repository storing the encrypted personal user data.

Further features of the disclosed design, and the advantages offered thereby, are explained in greater detail hereinafter with reference to specific example embodiments described below and illustrated in the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for controlling data access through the interaction of a short-range transceiver, such as a contactless card, with a client device. Data access control may be provided in the context of controlling access to personal user data. Requests for access to personal user data may be handled via the interaction of a short-range transceiver, such as a contactless card, with a client device such that the personal user data is only provided to service providers who are authorized to review the data, and disclosure of certain account identifier information, or account login information, need not be disclosed to service providers requesting access to personal user data. Benefits of the disclosed technology may include improved data security for personal user data, improved access to personal user data when access is required without user response or intervention (such as, e.g., during an emergency), and improved user experience.

Figure 1A:
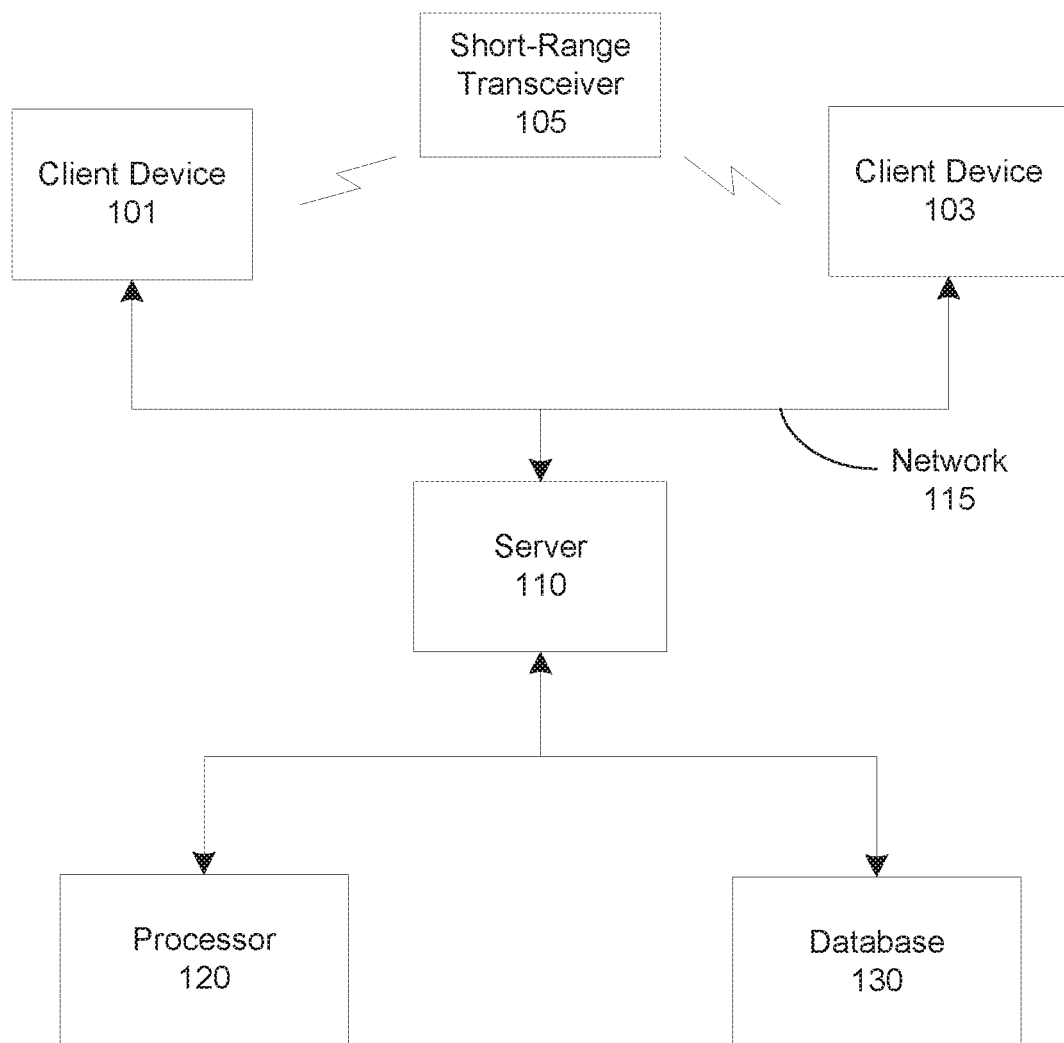
FIG. 1A is a diagram of a data access control system according to one or more example embodiments.

FIG. 1A shows a diagram illustrating a data access control system 100 according to one or more example embodiments. As discussed further below, system 100 may include client device 101, client device 103, short-range transceiver 105, server 110, processor 120 and database 130. Client device 101 and client device 103 may communicate with server 110 via network 115. Although FIG. 1 illustrates certain components connected in certain ways, system 100 may include additional or multiple components connected in various ways.

System 100 may include one or more client devices, such as client device 101 and/or client device 103, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Each of client devices 101 and 103 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Additional features that may be included in a client device, such as client device 101 and/or client device 103, are further described below with reference to FIG. 2.

System 100 may include one or more short-range transceivers, such as short-range transceiver 105. Short-range transceiver 105 may be in wireless communication with a client device, such as client device 101 and/or client device 103, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, the short-range transceiver 105 may be the same or similar as the client devices 101, 103. Additional features that may be included in a short-range transceiver, such as such as short-range transceiver 105, are further described below with reference to FIG. 3.

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or to server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more users, one or more service providers, and one or more accounts. Data relating to a user may include a user identifier and a user key, and may be maintained or organized in one or more accounts. Data relating to a service provider may include a service provider identifier and a service provider key, and may be maintained or organized in one or more accounts. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include information and data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101 and/or client device 103, via one or more networks, such as network 115. Network 115 may include one or more of a wireless network, a wired network or any combination of wireless network and wired network, and may be configured to connect client devices 101 and/or 103 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some example embodiments, server 110 may access records, including records in database 130, to determine a method or methods for communicating with client device 101 and/or client device 103. The communication method may include an actionable push notification with an application stored on client device 101 and/or client device 103.

Other communication methods may include a text message or an e-mail, or other messaging techniques appropriate in a network-based client/server configuration. Messages or requests by client devices 101 and/or 103 may be communicated to server 110 via an application on the client device, or may be sent by a text message or an e-mail, or other messaging techniques appropriate in a network-based client/server configuration. Communications originating with client device 101 or client device 103 may be sent to server 110 using the same communications method as communications originating with server 110, or via a different communications method.

Figure 1B:
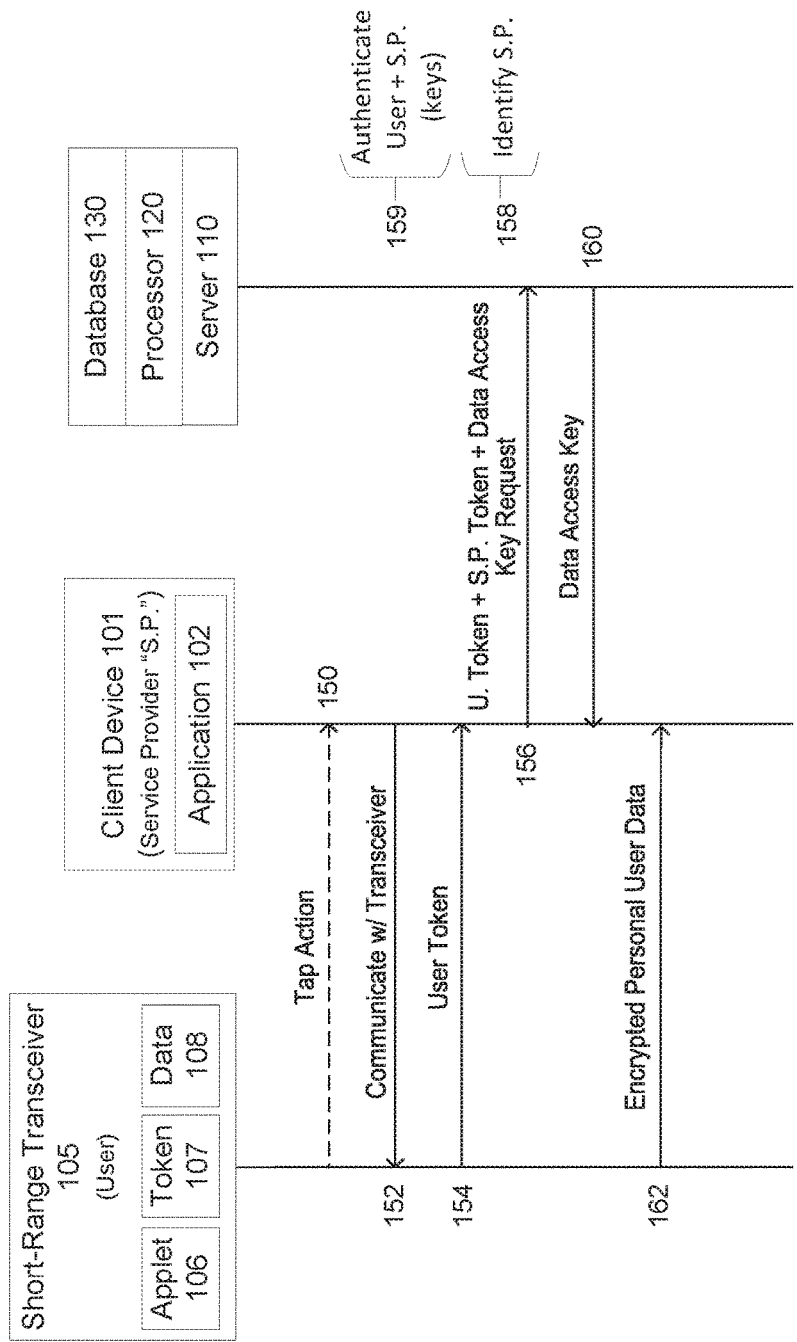
FIG. 1B is a diagram illustrating a sequence for providing data access control according to one or more example embodiments.

FIG. 1B shows a diagram illustrating a sequence for providing data access control according to one or more example embodiments, which may include a request by a service provider for a data access key to access or decrypt personal user data stored on a short-range transceiver. FIG. 1B references similar components of example embodiment system 100 as illustrated in FIG. 1A. Client device 101 may be associated with a service provider. The service provider may have an associated service provider token. Client device 101 may include application 102, which may include instructions for execution by client device 101. Client device 101 may include features further described below with reference to FIG. 2. Application 102 may be configured to provide a user interface for the service provider when using client device 101. Application 102 may be configured to communicate, via client device 101, with other client devices, with short-range transceiver 105, and with server 110. Application 102 may be configured to receive requests and send messages as described herein with reference to client device 101. Service provider information and user information, including identifiers and/or keys, may be stored in database 130.

Short-range transceiver 105 may be associated with a user. Short-range transceiver 105 may include, for example, a contactless card, and may include features further described below with reference to FIG. 3. Short-range transceiver 105 may have memory storing an applet 106 and/or a token 107, and storing personal user data 108. Token 107 and personal user data 108 may be associated with the user.

A token may be used to increase security through token authorization. Server 110 may send a validation request to a client device, such as client device 101, receive responsive information from the client device, and if validated, send a validation token back to the client device. The validation token may be based on a pre-determined token, or may be a dynamic token based on an algorithm that can be secret and known only to server 110 and the client device; the algorithm may include live parameters independently verifiable by the participants, such as the temperature at a particular location or the time. The token may be used to verify the identity of the service provider or the user. The validation request and/or validation token may be based on token 107 stored on short-range transceiver 105.

Personal user data 108 may include personal user information or data that may be of a sensitive or confidential nature, such as, for example, personal health data, social security number, family contacts, etc. (including types of data identified herein with reference to FIG. 3). Personal user data 108 may be encrypted and stored in a secure format to prevent unauthorized access.

In some example embodiments, personal user data may include personal health data such as, e.g., height, weight, blood type, prescription medications, allergies, emergency contacts, treatment or DNR instructions, etc. Personal user data may also include personal identifying data such as name, gender, date of birth, etc. A service provider using client device 101 may be, e.g., a first responder, an emergency team member, or an emergency health care provider or technician, and may be associated with a service entity, such as a fire or ambulance department, a police department, a hospital, etc.

In some example embodiments, application 102 may display an instruction on client device 101 prompting the service provider to initiate a tap action between short-range transceiver 105 and client device 101. As used herein, a tap action may include tapping short-range transceiver 105 against client device 101 (or vice-versa). For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa).

At label 150, there may be a tap action between short-range transceiver 105 and client device 101. The tap action may be in response to a prompt displayed on client device 101.

At label 152, application 102 may communicate (via client device 101) with short-range transceiver 105 (e.g., after short-range transceiver 105 is brought near client device 101). Communication between application 102 and short-range transceiver 105 may involve short-range transceiver 105 (such as, e.g., a contactless card) being sufficiently close to a card reader (not shown) of the client device 101 to enable NFC data transfer between application 102 and short-range transceiver 105, and may occur in conjunction with (or response to) a tap action between short-range transceiver 105 and client device 101 (such as, e.g., the tap action at label 150). The communication may include exchange of data or commands to establish a communication session between application 102 and short-range transceiver 105. The exchange of data may include transfer or exchange of one or more keys, which may be preexisting keys or generated as session keys. In some example embodiments, the communication may occur upon entry of short-range transceiver 105 into a short-range communication field of client device 101 prior to a tap action between short-range transceiver 105 and client device 101.

At label 154, short-range transceiver 105 may send user token 107 associated with the user to application 102. Token 107 may include a user identifier. In some example embodiments, user token 107 may include a key associated with the user. In some example embodiments, the sending of token 107 to application 102 may be in conjunction with (or response to) a tap action between short-range transceiver 105 and client device 101 (such as, e.g., the tap action at label 150). In some example embodiments, the sending of token 107 to application 102 may occur upon entry of short-range transceiver 105 into a short-range communication field of client device 101 prior to a tap action between short-range transceiver 105 and client device 101.

At label 156, application 102 may send user token 107 to server 110, along with a service provider token associated with the service provider and a request for a data access key. This may be carried out in response to a tap action between short-range transceiver 105 and client device 101 (such as, e.g., the tap action at label 150). The data access key would enable the service provider to decrypt the encrypted personal user data 108.

At label 158, processor 120 may receive (e.g. via server 110) the user token, the service provider token, and the data access key request. Processor 120 may use the user token to identify the user. Processor 120 may use the service provider token to identify the service provider as the sender of the data access key request. In some example embodiments, identifying the service provider may be carried out by using a service provider identifier in the token to look up information in database 130. In some example embodiments, at label 159, if the service provider token includes a key associated with the service provider, processor 120 may use the service provider key to authenticate the service provider; likewise, if the user token includes a key associated with the user, processor 120 may use the user key to authenticate the user. Based on the identity of the service provider (and as such identity may be authenticated), processor 120 may verify whether the service provider is authorized to receive the data access key to decrypt—and thereby obtain access to—personal user data 108. In an example embodiment, the service provider key may be available to a service provider and valid for a limited period of time, such as, e.g., a daily, weekly, monthly or other basis. Client device 101 may transmit to server 110 a request for the service provider key at intervals when a new key becomes available (e.g., daily, weekly, monthly or other basis). Receiving the service provider key by client device 101 does not require the service provider to be in the vicinity of short-range transceiver 105, and the service provider key may be requested or received by client device 101 independently of any tap action with short-range transceiver 105.

At label 160, processor 120 may send the data access key to client device 101. As mentioned above, processor 120 may verify that the service provider is authorized to receive the data access key. The data access key may be stored in database 130, or may be generated based on the user key, on the service provider key, or on a combination of both the user key and the service provider key. The user key may be stored in database 130 or included in user token 107. The service provider key may be stored in database 130 or included in the service provider token received from client device 101.

In an example embodiment, processor 120 may instead send a denial notification (not shown) to client device 101, indicating that the service provider is not authorized to receive the data access key.

At label 162, short-range transceiver 105 may send encrypted personal user data 108 to application 102 via client device 101. Of note, the timing of transmission of encrypted personal user data 108 by short-range transceiver 105 to client device 101, in relation to the other events described with respect to FIG. 1B, is not critical. The encrypted personal user data 108 may be sent upon the first tap action, or at any time including after receipt of the data access key by client device 101.

Application 102 may be configured to receive, decrypt, and access encrypted personal user data 108 using the received data access key. In some embodiments, application 102 may cause the display of the personal user data on client device 101. In some embodiments, application 102 may be permitted to store the personal user data on client device 101 for retrieval on a time-limited, or limited number of uses, basis.

In one or more example embodiments, access by the service provider to personal user data may be limited in accordance with data control parameters. In an example embodiment, data control parameters may be stored in database 130. In an example embodiment, data control parameters may be stored in memory of short-range transceiver 105. Data control parameters stored in memory of short-range transceiver 105 may be sent to application 102 and used by application 102 to limit access by the service provider to personal user data. Applet 106 may be configured to receive the data control parameters and store the data control parameters in in memory of short-range transceiver 105.

In one or more example embodiments, data control parameters may be used to limit access by the service provider to personal user data in one or more ways. For example, the data control parameters may permit access only for a specific or limited period of time. As another example, the data control parameters may permit access to a single use by the service provider. As another example, the data control parameters may permit access only when short-range transceiver 105 is detected within range of a short-range communication field of client device 101. In one or more embodiments, the user may be prompted to confirm that the service provider may access the personal user data. In one or more embodiments, the user may pre-approve access to personal data by service providers, such that the user would not need to give permission at the time a service provider attempts to gain data access. The user may confirm or pre-approve access to personal user data by various means, including by tapping the user's short-range transceiver to a client device in response to a prompt.

In an example embodiment, the personal user data may be stored in database 130 and may be updated. The updated personal user data may be stored in database 130 and transmitted to client device 101 upon request for the personal user data.

In an example embodiment, application 102 may be launched in response to a tap action between short-range transceiver 105 and client device 101.

Figure 1C:
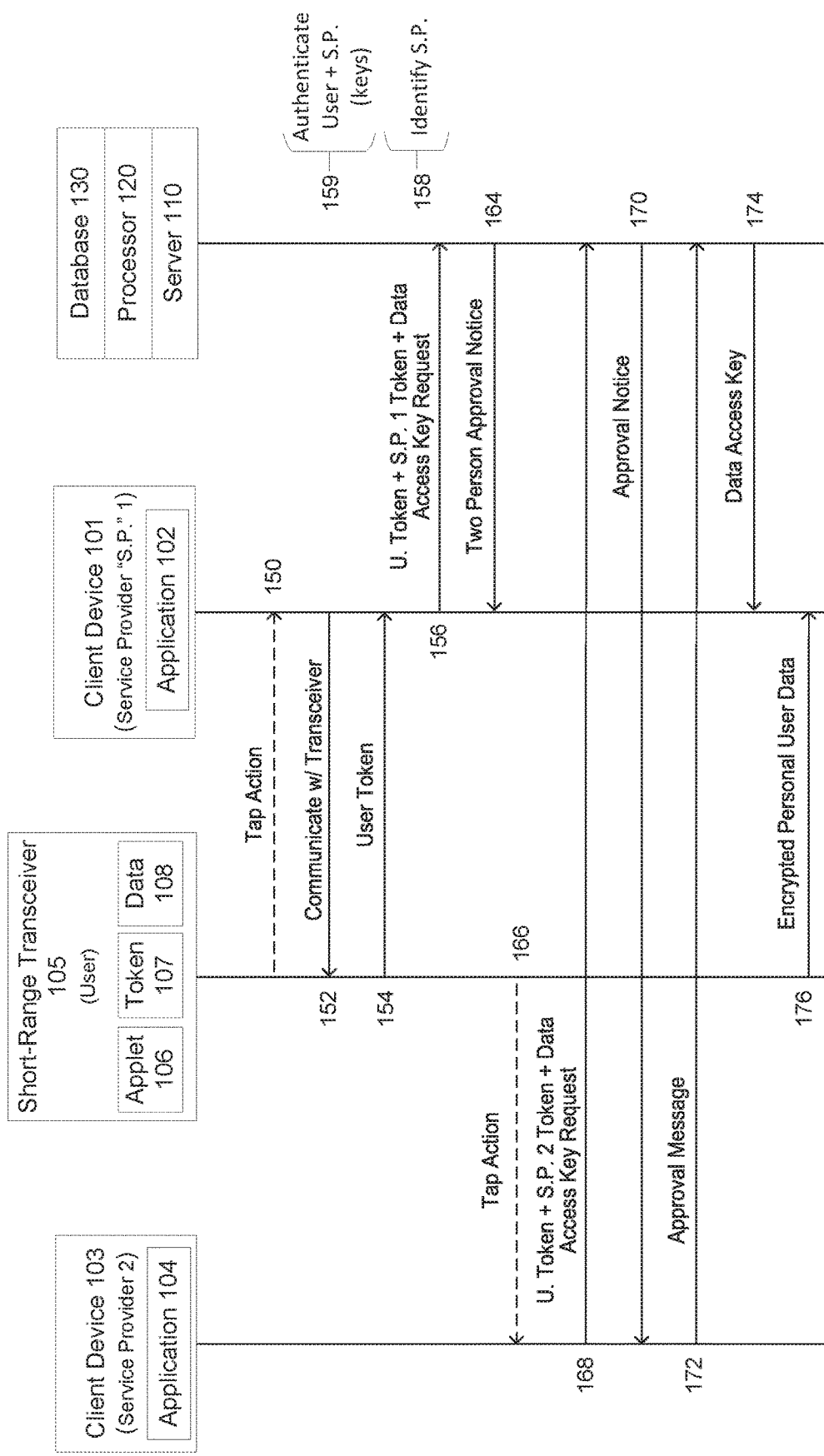
FIG. 1C is a diagram illustrating a sequence for providing data access control according to one or more example embodiments.

FIG. 1C shows a diagram illustrating a sequence for providing data access control according to one or more example embodiments, which may include a request by a service provider for a data access key to access or decrypt personal user data stored on a short-range transceiver. FIG. 1C references similar components of example embodiment system 100 as illustrated in FIG. 1A and similar features of example embodiment system 100 as illustrated in FIG. 1B, including features described above with respect to labels 150-159 (which are not repeated here). The service provider referenced in the description above relating to FIG. 1B will be referred to as the first service provider in describing FIG. 1C. Referring to FIG. 1C, upon identifying the first service provider as the sender of a data access key request for access to personal user data of the user, according to procedures described above with reference to labels 150-159, it may be determined that two person approval is required.

Responding to the two person approval requirement may involve client device 103 associated with a second service provider. The second service provider may be associated with the same service entity as the first service provider (referenced above), or may be associated with an entity related to that service entity, or associated with a different entity. Client device 103 may include application 104, which may include instructions for execution by client device 103. Client device 103 may include features further described below with reference to FIG. 2. Application 104 may be configured to provide a user interface for the second service provider when using client device 103. Application 104 may be configured to communicate, via client device 103, with other client devices, with short-range transceiver 105, and with server 110. Application 104 may be configured to receive requests and send messages as described herein with reference to client device 103.

At label 164, processor 120 may send (e.g. via server 110) a two person approval notice to client device 101, notifying the first service provider that a second service provider is needed to approve the data access key request. Application 102 may cause a message to be displayed on client device 101 indicating that the system is awaiting approval of the request by a second service provider. In some example embodiments, the notification may be sent to client device 103, or to both client device 101 and client device 103. Processor 120 may open a data access session with application 102 to provide tracking of the data access key request (relating to the user, via the user token) while awaiting approval.

At label 166, there may be a tap action between short-range transceiver 105 and client device 103. The tap action may be responsive to the two person approval notice. Application 104 may receive the user token 107 from short-range transceiver 105.

At label 168, application 104 may send the user token to server 110, along with a second service provider token associated with the second service provider and a data access key request; this may be in response to the tap action described above with reference to label 166. The second service provider token may include a second service provider key. Processor 120 may open a data access session with application 104 to provide separate tracking of the data access key request (relating to the user, via the user token) from the second service provider. Processor 120 may use the second service provider token to identify the second service provider as the sender of the data access key request. Based on the user token, processor 120 may determine that the data access key request made by the second service provider corresponds to the open data access key request made by the first service provider, and thus may be seeking to approve access to the personal user data by the first service provider.

At label 170, processor 120 may send an approval notice to application 104 requesting approval by the second service provider of the data access key request submitted by the first service provider.

Figure 5:
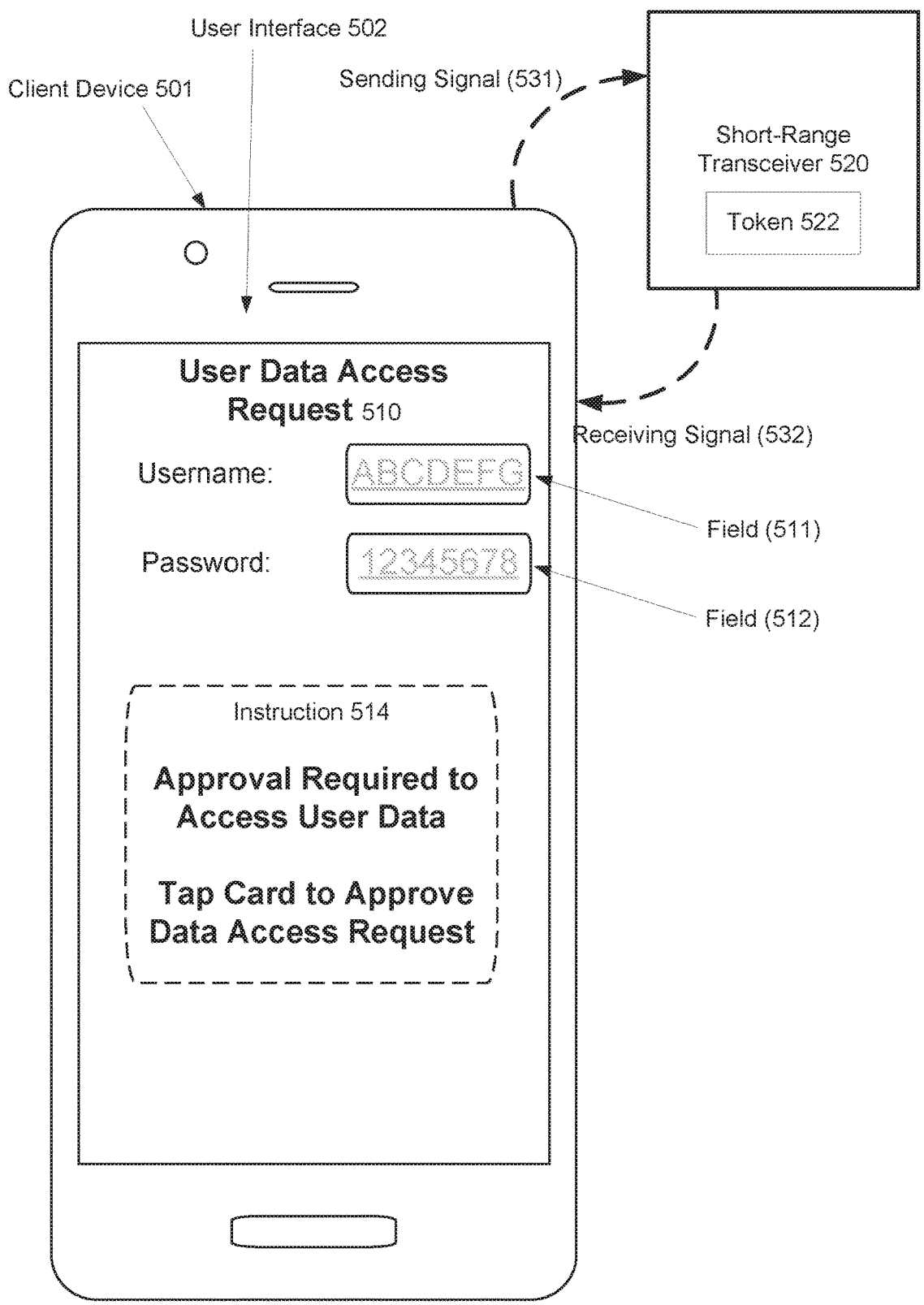
FIG. 5 is diagram illustrating interaction between a client device and a short-range transceiver used in a data access control system according to one or more example embodiments.

Application 104 may display an instruction on client device 103 for the second service provider to approve the data access key request made by the first service provider. In some example embodiments, the display may instruct the second service provider to tap short-range transceiver 105 with/against client device 103 to indicate approval (e.g., as shown in FIG. 5). In some example embodiments, the display may instruct the second service provider to press a button (not shown in FIG. 5) to indicate approval. In one or more example embodiments, the display on client device 103 of an instruction to approve the data access key request may be in response to the approval notice of label 170. In one or more example embodiments, the display on client device 103 of an instruction to approve the data access key request may be in response to the two person approval notice of label 164.

At label 172, once the second service provider has acted (e.g., by a tap action or pressing a button) to indicate approval, application 104 may send an approval message to server 110. Based on the approval message, processor 120 may determine that the second service provider has approved the data access key request by the first service provider.

In an example embodiment, in response to a two person approval notice, application 102 may display on client device 101 a code (such as a QR code or a numeric code), to be scanned by or otherwise entered into client device 103. Application 104 may transmit the code (as scanned or entered into client device 103) to server 110 to indicate approval of the data access key request. Based on the transmitted code, processor 120 may determine that the second service provider has approved the data access key request by the first service provider.

At label 174, processor 120 may send the data access key to client device 101. The data access key may be stored in database 130, or may be generated based on the user key, on the first service provider key, or on a combination of the user key and the first service provider key, or on a combination of the user key, the first service provider key and the second service provider key. The user key may be stored in database 130 or included in user token 107. The first service provider key may be stored in database 130 or included in the first service provider token received from client device 101. The second service provider key may be stored in database 130 or included in the second service provider token received from client device 103.

At label 176, short-range transceiver 105 may send encrypted personal user data 108 to application 102 via client device 101. Of note, the timing of transmission of encrypted personal user data 108 by short-range transceiver 105 to client device 101, in relation to the other events described with respect to FIG. 1B or 1C, is not critical. The encrypted personal user data 108 may be sent upon the first tap action, or at any time including after receipt of the data access key by client device 101.

As discussed above with reference to FIG. 1B, application 102 may be configured to receive, decrypt, and access encrypted personal user data 108 using the received data access key, including, for example, causing the display of the personal user data on client device 101, and/or storing the personal user data on client device 101 for retrieval on a time-limited, or limited number of uses, basis. In an example embodiment, the received data access key may be stored on client device 101, and application 102 may display the personal user data on the client device only if the data access key remains stored on the client device.

In an example embodiment, application 104 may be launched in response to a tap action between short-range transceiver 105 and client device 103.

Figure 2:
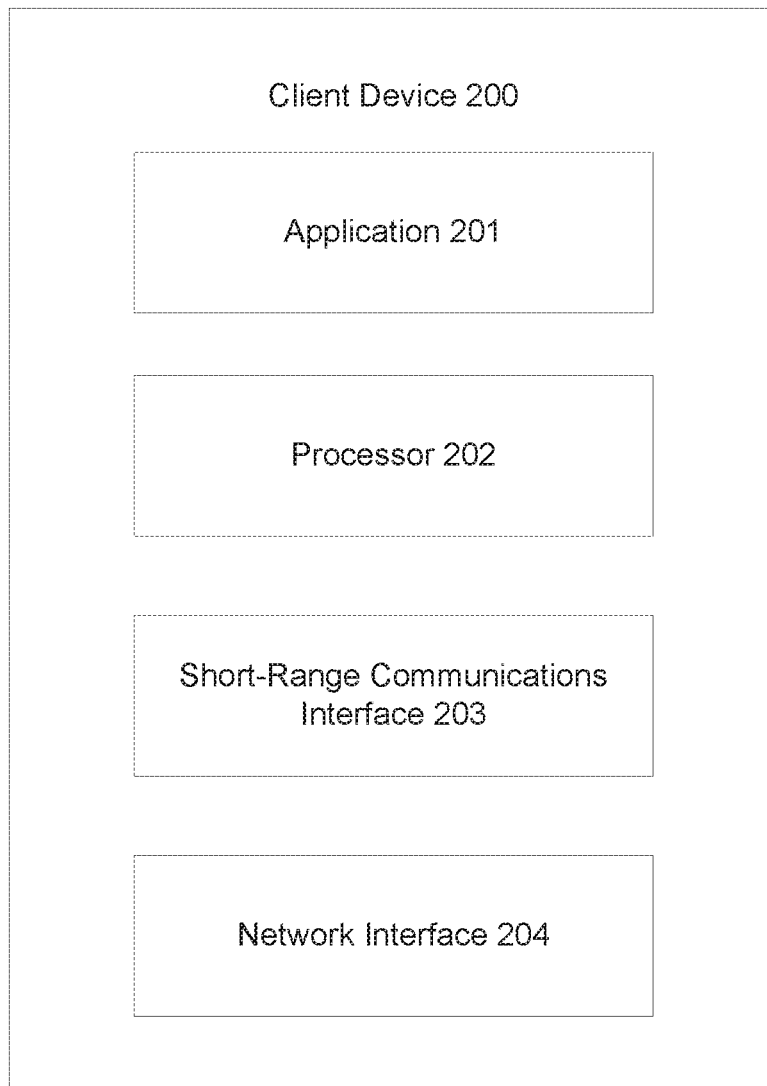
FIG. 2 illustrates components of a client device used in a data access control system according to one or more example embodiments.

FIG. 2 illustrates components of a client device 200 used in a data access control system according to one or more example embodiments. In one or more example embodiments, client device 200 may be one or more of client devices 101 and/or 103, described above with reference to FIG. 1A and FIGS. 1B-1C. Client device 200 may include one or more applications 201, one or more processors 202, a short-range communications interface 203, and a network interface 204. Application 201 may include a software application or executable program code to be executed on processor 202 and configured to carry out features described herein for any of the client devices, such as client devices 101 and/or 103, and/or any of the features described herein with reference to application 102. Application 201 may be configured, for example, to transmit and/or receive data with other devices via client device 101, such as, e.g., via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may include a read-only memory, write-once read-multiple memory and/or read/write memory, e.g., RAM, ROM, and EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 300, such as a touch-screen, keyboard, mouse, cursor-control device, touchscreen, microphone, digital camera, video recorder, or camcorder. The device inputs may be used to enter information and interact with the client device 200 and, by extension, with the systems described herein.

Figure 3:
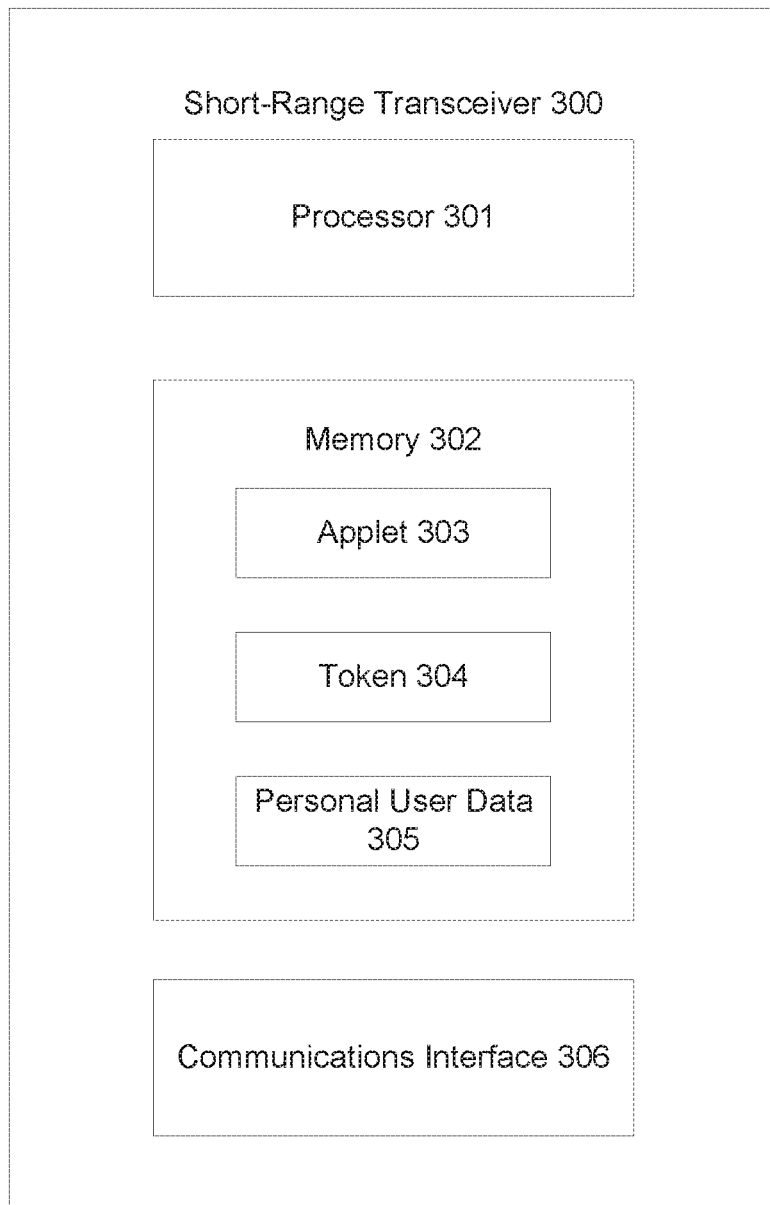
FIG. 3 illustrates components of a short-range transceiver used in a data access control system according to one or more example embodiments.

FIG. 3 illustrates components of a short-range transceiver 300 used in a data access control system according to one or more example embodiments. In one or more example embodiments, short-range transceiver 300 may be one or more of short-range transceiver 105, described above with reference to FIG. 1A and FIGS. 1B-1C. Short-range transceiver 300 may include, for example, a contactless card, or may include a device with a varying form factor such as a fob, pendant or other device configured to communicate within a short-range communications field. Short-range transceiver 300 may include a processor 301, memory 302, and short-range communications interface 306.

Processor 301 may include one or more processing devices such as a microprocessor, RISC processor, ASIC, etc., and may include associated processing circuitry. Processor 301 may include, or be connected to, memory storing executable instructions and/or data, as may be necessary or appropriate to control, operate or interface with the other features of short-range transceiver 300, including applet 303. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory or read/write memory, e.g., RAM, ROM, and EEPROM. Memory 302 may be configured to store one or more applets 303, one or more tokens 304, and personal user data 305. Applet 303 may comprise one or more software applications configured to execute on processor 301, such as a Java Card applet that may be executable on a contact less card. However, it is understood that applet 303 is not limited to Java Card applets, and instead may be any software application operable on contactless cards or other devices having limited memory. Applet 303 may be configured to respond to one or more requests, such as near field data exchange requests from a client device, including requests from a device having a reader such as a mobile device NFC reader. Applet 303 may be configured to read (or write) data, including token 304 and/or personal user data 305 from (or to) memory 302 and provide such data in response to a request.

Token 304 may include a unique alphanumeric identifier assigned to a user of the short-range transceiver 300, and the identifier may distinguish the user of the short-range transceiver 300 from other users of other short-range transceivers (such as other contactless card users). In some example embodiments, token 304 may identify both a customer and an account assigned to that customer and may further identify the short-range transceiver (such as a contactless card) associated with the customer's account. In some example embodiments, token 304 may include a key unique to the user or customer with which the short-range transceiver is associated.

Personal user data 305 may be stored in memory 302, and may, e.g., be located in specific memory location or in a data file identified by file name. Personal user data 305 may include personal user information or data that may be of a sensitive or confidential nature, such as, for example, personal health data, social security number, family contacts, etc. Personal user data 305 may be encrypted and stored in a secure format to prevent unauthorized access. Any suitable algorithm/procedure (including, e.g., public/private key encryption) may be used for data encryption and for authorized decryption.

Personal user data 305 (and personal user data 108 described above with reference to FIGS. 1B-1C) may include any one or more of the following categories of data: full name, date of birth, Email address, home address, ethnicity/race, gender, place of birth, mother's maiden name, Social Security number, national ID number(s), passport number, visa permit number, driver's license number, vehicle registration plate number, genetic information, medical information, disability information, insurance details, location information, what you are doing when, status, events attended, sexual orientation, education history, grades, employment history, salary, job position/title, account information for financial, social, utility, services, or other accounts, photos, political and religious leanings and affiliation, views on controversial issues, history/background, credit score/record, sites registered on, criminal record, and/or commercially sensitive information.

Short-range communications interface 306 may support communication via a short-range wireless communication field, such as NFC, RFID, or Bluetooth. Short-range transceiver 300 may also include one or more antennas (not shown) connected to short-range communications interface 306 to provide connectivity with a short-range wireless communications field.

Figure 4:
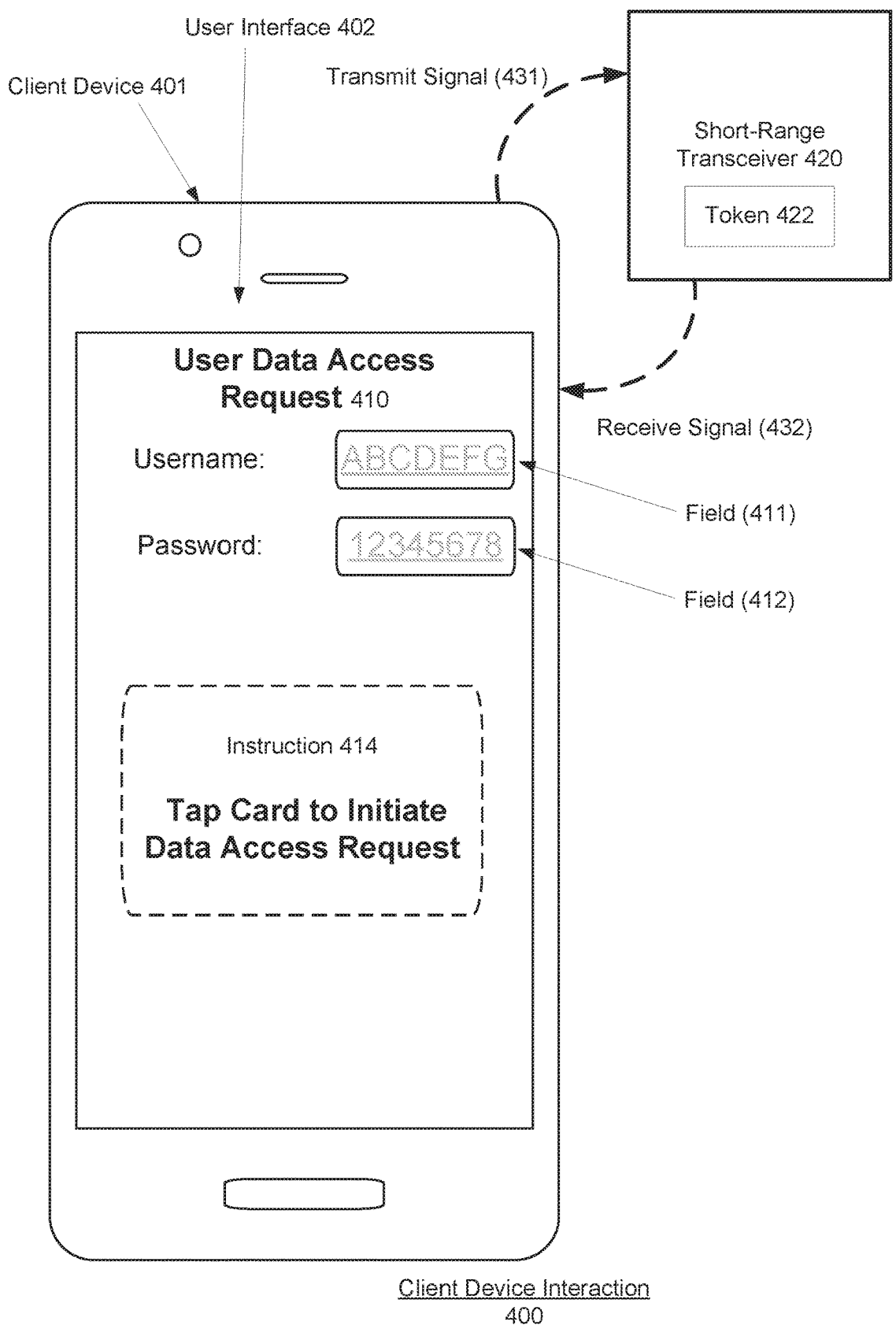
FIG. 4 is diagram illustrating interaction between a client device and a short-range transceiver used in a data access control system according to one or more example embodiments.

FIG. 4 is diagram illustrating the interaction 400 between a client device 401 and a short-range transceiver 420 used in a data access control system according to one or more example embodiments, including embodiments described above with reference to FIGS. 1A-1C. Client device 401 may be client device 101 described above with reference to FIG. 1A and FIGS. 1B-1C. Client device 401 may be associated with the (first) service provider as described above with reference to FIGS. 1B-1C. User interface 402 may be generated by application 102 described above with reference to FIGS. 1B-1C. Short-range transceiver 420 may be short-range transceiver 105 described above with reference to FIG. 1A and FIGS. 1B-1C. Upon entry of short-range transceiver 420 into a short-range communication field of client device 401 (such as, e.g., via a tap action), client device 401 may communicate with short-range transceiver 420. Client device 401 may send data or commands to short-range transceiver 420 via transmit signal 431, and may receive data from short-range transceiver 420, including token 422, via receive signal 432. Short-range transceiver 420 may also send to client device 401 encrypted personal user data (not shown). Communication between client device 401 and short-range transceiver 420 may proceed as described above with reference to FIGS. 1B-1C (e.g., client device 101 or 103 and short-range transceiver 105).

User interface 402 may present on client device 401 a screen display for a user data access request 410, which may include field 411 and field 412. If necessary, the first service provider may enter a username in field 411 and password in field 412. The screen display may include an instruction 414 prompting the first service provider to tap short-range transceiver 420 (in the example shown, short-range transceiver 420 may be a contactless card) to initiate a data access key request to obtain a data access key required to decrypt the encrypted personal user data. Instruction 414 may be a push notification from server 110 (shown in FIG. 1A and FIGS. 1B-1C). Client device 401 may transmit a data access key request to server 110 (shown in FIG. 1A and FIGS. 1B-1C) along with a user token 422 (from short-range transceiver 420) and a first service provider token in response to a tap action.

FIG. 5 is diagram illustrating the interaction 500 between a client device 501 and a short-range transceiver 520 used in a data access control system according to one or more example embodiments, including embodiments described above with reference to FIGS. 1A-1C. Client device 501 may be client device 103 described above with reference to FIG. 1A and FIG. 1C. Client device 501 may be associated with the second service provider as described above with reference to FIG. 1C. User interface 502 may be generated by application 104 described above with reference to FIG. 1C. Short-range transceiver 520 may be short-range transceiver 105 described above with reference to FIG. 1A and FIGS. 1B-1C. Upon entry of short-range transceiver 520 into a short-range communication field of client device 501 (such as, e.g., via a tap action), client device 501 may communicate with short-range transceiver 520. Client device 501 may send data or commands to short-range transceiver 520 via transmit signal 531, and may receive data from short-range transceiver 520, including token 522, via receive signal 532. Communication between client device 501 and short-range transceiver 520 may proceed as described above with reference to FIGS. 1B-1C (e.g., client device 101 or 103 and short-range transceiver 105).

User interface 502 may present on client device 501 a screen display for a user data access request 510, which may include field 511 and field 512. If necessary, the second service provider may enter a username in field 511 and password in field 512. The screen display may include an instruction 514 notifying the second service provider that two service providers are needed to approve the user data access request, and prompting the second service provider to tap short-range transceiver 520 (in the example shown, short-range transceiver 520 may be a contactless card) to complete the approval process. Instruction 514 may be a push notification from server 110 (shown in FIG. 1A and FIGS. 1B-1C). Client device 501 may transmit a user token 522 (from short-range transceiver 520) and a second service provider token to server 110 in response to a tap action.

Figure 6A:
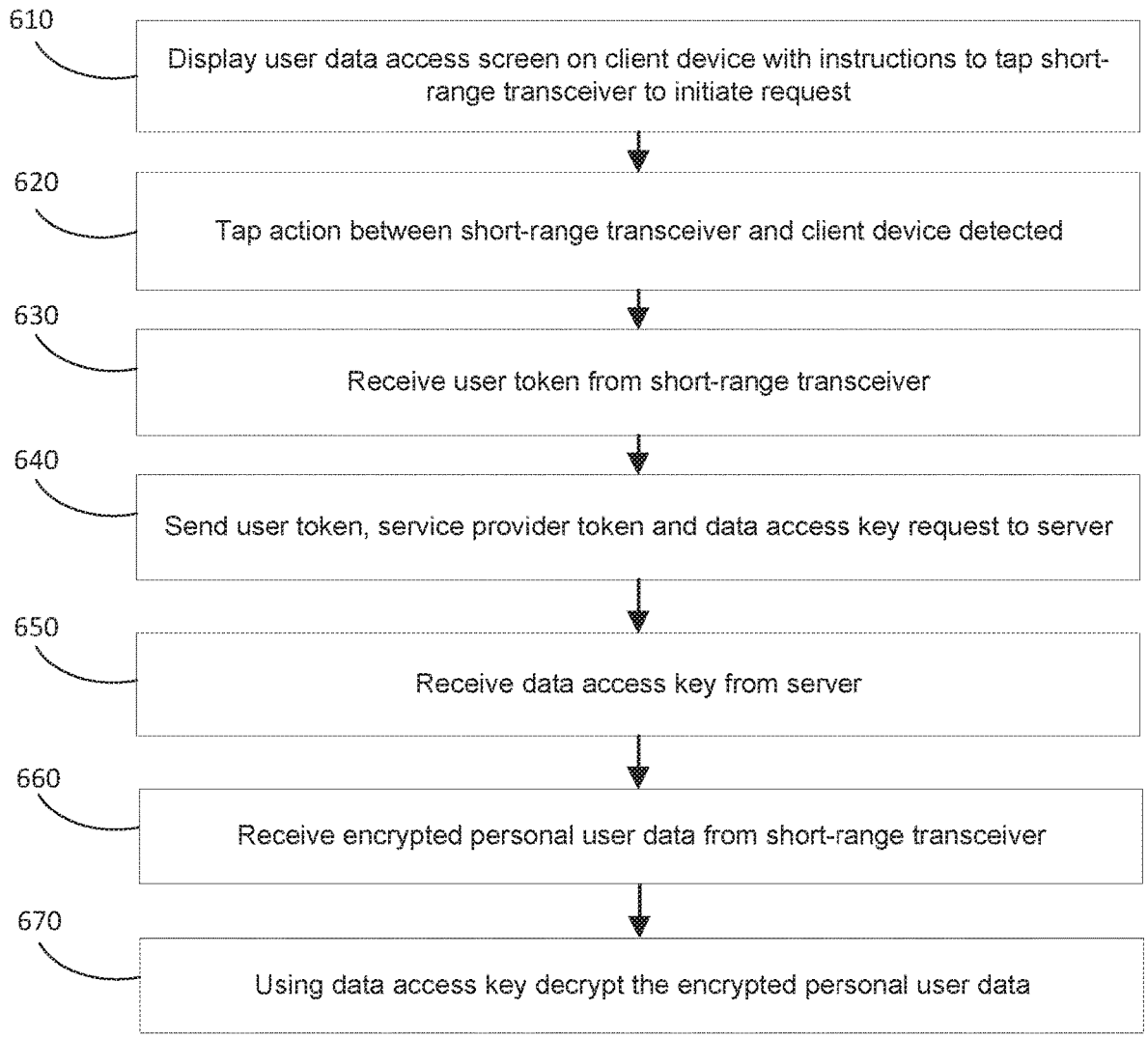
FIGS. 6A-6B provide a flowchart illustrating a method of data access control according to one or more example embodiments.

FIG. 6A is a flowchart illustrating a method of data access control 600 according to one or more example embodiments, with reference to components and features described above, including but not limited to the figures and associated description. Data access control method 600 may be carried out by application 102 executing on client device 101 associated with the (first) service provider. Short-range transceiver 105 is associated with the user.

At block 610, application 102 may cause client device 101 to display a user data access request screen (such as shown in, and described above with reference to, FIG. 4). The user data access request screen may include an instruction to tap short-range transceiver 105 with/against client device 101 to initiate a data access key request. As described above with reference to FIG. 4, short-range transceiver 420 (and, hence, short-range transceiver 105) may be a contactless card.

At block 620, a tap action may be detected between short-range transceiver 105 and client device 101.

At block 630, user token 107 may be received from short-range transceiver 105. Receiving user token 107 may be in response to the tap action of block 620. User token 107 may include a user identifier. In some example embodiments, user token 107 may include a user key associated with the user.

At block 640, user token 107 and a service provider token (associated with the service provider) may be transmitted to server 110 along with data access key request, to obtain a key for decrypting the encrypted personal user data received (or to be received) from short-range transceiver 105. Transmission of user token 107, the service provider token and the data access key request to server 110 may be in response to the tap action of block 620.

At block 650, a data access key may be received from server 110.

At block 660, the encrypted personal user data may be received from short-range transceiver 105. As discussed above, the encrypted personal user data may be received at any time during the process.

At block 670, the data access key may be used to decrypt the encrypted personal user data. As discussed above, in some embodiments, application 102 may cause the display of the personal user data on client device 101. In some embodiments, application 102 may be permitted to store the personal user data on client device 101 for retrieval on a time-limited, or limited number of uses, basis.

Figure 6B:
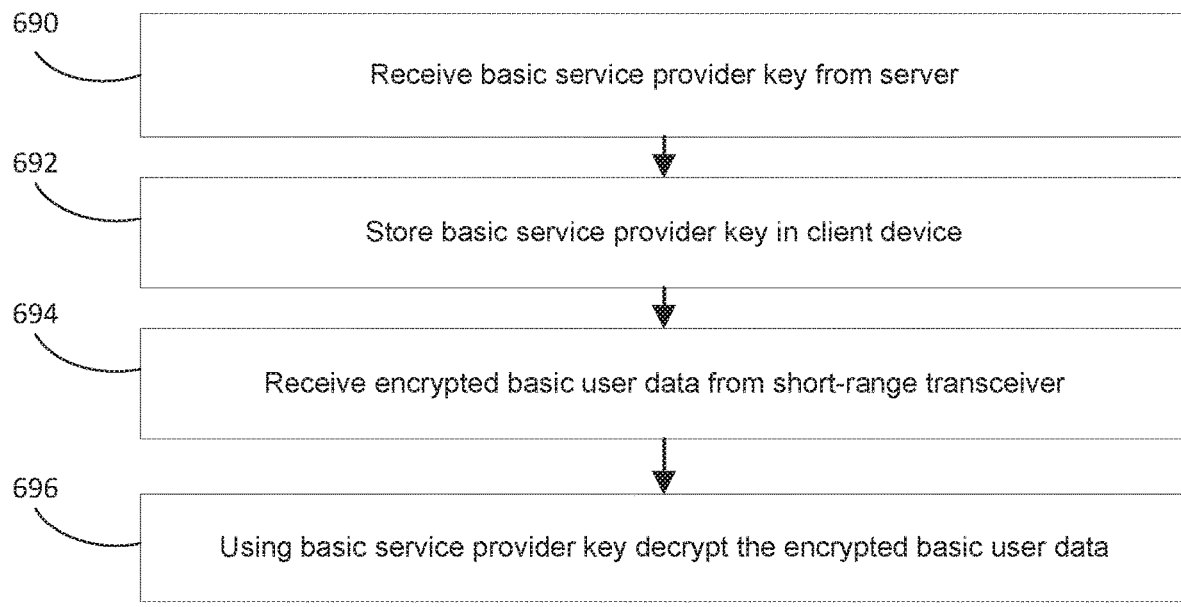

FIG. 6B is a flowchart illustrating a method of data access control 600 according to one or more example embodiments, with reference to components and features described above, including but not limited to the figures and associated description. The features described in FIG. 6B may be in addition to the features referenced in FIG. 6A. The description of blocks referenced in FIG. 6A will not be repeated here. As described above with reference to FIG. 6A, data access control method 600 may be carried out by application 102 executing on client device 101 associated with the (first) service provider. Short-range transceiver 105 is associated with the user.

Memory located on short-range transceiver 105 (such as memory 302 shown in FIG. 4) may contain basic user data, such as name, gender, and date of birth. This basic user data could be a subset of the types of data contained in the personal user data, or may be additional data, and/or may be data that is unlikely to change (or less likely to change over time than other types of personal user data). In some example embodiments, such as when personal user data includes health data, the basic user data could include certain aspects of health data, such as, for example, height, weight, allergies, prescriptions, DNR instructions, etc. The types of information that may be included in basic user data may be selectable by the user.

Basic user data may be stored in short-range transceiver memory 302 and may, e.g., be located in specific memory location or in a data file identified by file name.

The basic user data may be encrypted with a key such that it may be decrypted with a basic service provider key that may be available to service providers. The basic service key may be different from the data access key required to descript personal user data 305. In one or more embodiments a basic service provider key may be available to service providers and valid for a limited period of time, such as, e.g., a daily, weekly, monthly or other basis. The basic service provider key may be common for all personnel associated with a particular service provider entity. The basic service provider key may be stored in database 130, or may be generated by the system based on the identity of the service provider. Storing the basic service provider key (or generating the key) by the system and pushing the key to the client device provides a way of controlling access and permits access to be logged and tracked for auditing purposes.

At block 690, a basic service provider key is received from the server. The basic service provider key may be requested and/or obtained at any time, according to arrangements or protocols that the service provider (or service provider entity) may have with system 100. For example, client device 101 may transmit to server 110 a request for the basic service provider key at intervals when a new key becomes available (e.g., daily, weekly, monthly or other basis). Receiving the basic service provider key does not require the service provider to be in the vicinity of short-range transceiver 105, and the basic service provider key may be requested or received independently of any tap action with short-range transceiver 105.

At block 692, the basic service provider key may be stored in memory located in client device 101, allowing for later recall and use of the basic service provider key by the service provider at a later time.

At block 694, encrypted basic user information may be received from short-range transceiver 105. This may be in response to a tap action between short-range transceiver 105 and client device 101, or otherwise may be received at any time once short-range transceiver 105 is present within range of a short-range wireless communication field of client device 101.

At block 696, the basic service provider key may be used to decrypt the encrypted basic user data. Application 102 may cause the display of the basic user data on client device 101. In some embodiments, application 102 may be permitted to store the basic user data on client device 101 for retrieval on a time-limited, or limited number of uses, basis. In an example embodiment, the basic user data may be stored on transceiver 105 in an unencrypted format. In an example embodiment, the basic user data may be received by client device 101 in an unencrypted form and accessed without the need for a basic service provider key. Whether the basic user data is stored or provided in an unencrypted format may be determined by the user.

Figure 7A:
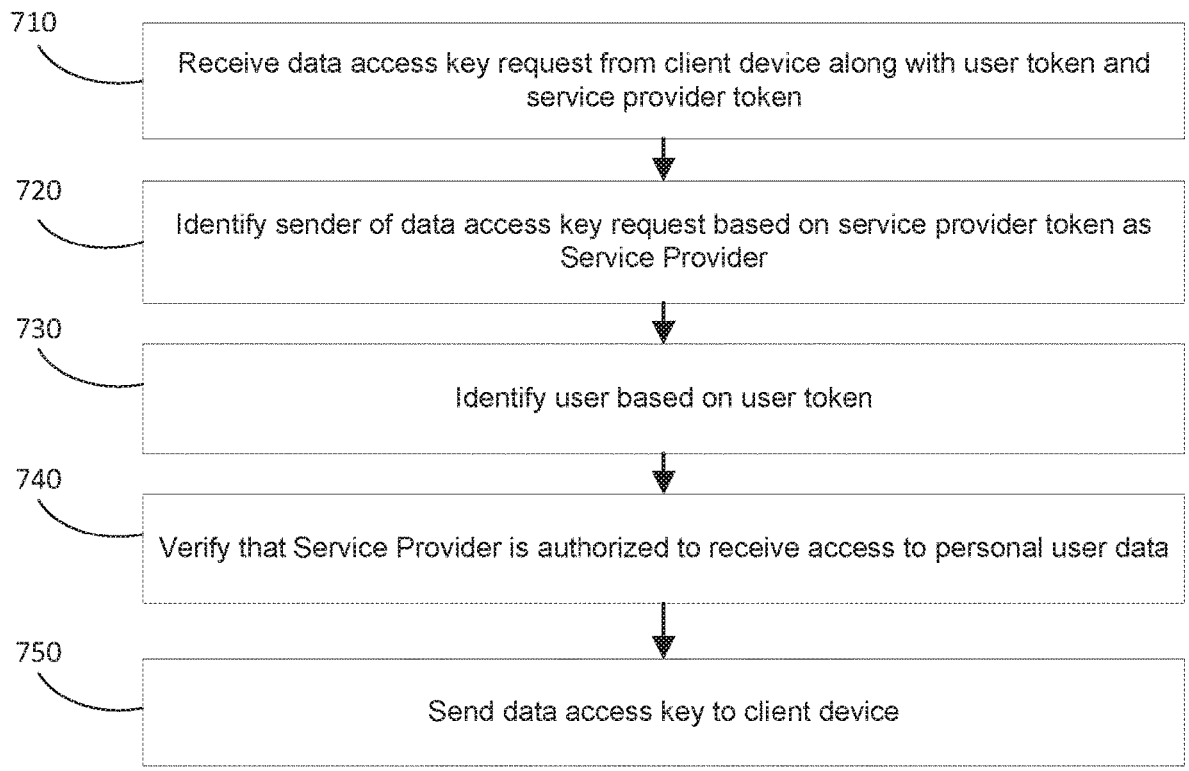
FIGS. 7A-7C provide a flowchart illustrating one or more methods of data access control according to one or more example embodiments.

FIG. 7A is a flowchart illustrating a method of data access control 700 according to one or more example embodiments, with reference to components and features described above, including but not limited to the figures and associated description. Data access control method 700 may be carried out by processor 120 in communication with, via server 110, client device 101 associated with the first service provider and/or client device 103 associated with the second service provider.

At block 710 a data access key request may be received, along with user token 107 and a service provider token (associated with the first service provider), from client device 101 associated with a first service provider, requesting a data access key to enable decryption of encrypted personal user data. Token 107 may include a user identifier. In some example embodiments, token 107 may include a user key associated with the user. In some example embodiments, the service provider token may include a first service provider key.

At block 720, the sender of the data access key request may be identified as the first service provider based on the service provider token. In some example embodiments, when the service provider token includes the first service provider key associated with the first service provider, the first service provider key may be used to authenticate the first service provider.

At block 730, the user may be identified based on received user token 107. In some example embodiments, when token 107 includes the user key associated with the user, the user key may be used to authenticate the user.

At block 740, the processor may verify that the first service provider is authorized to receive access to the personal user data (and thus authorized to obtain the data access key). Authorization may be based on the identity of the service provider, or the identity of the user, or both, and may include retrieval of information from database 130.

At block 750, a data access key may be sent to client device 101 associated with the service provider. As described above, the data access key may be stored in database 130, or may be generated based on the user key, on the first service provider key, or on a combination of the user key and the first service provider key.

Figure 7B:
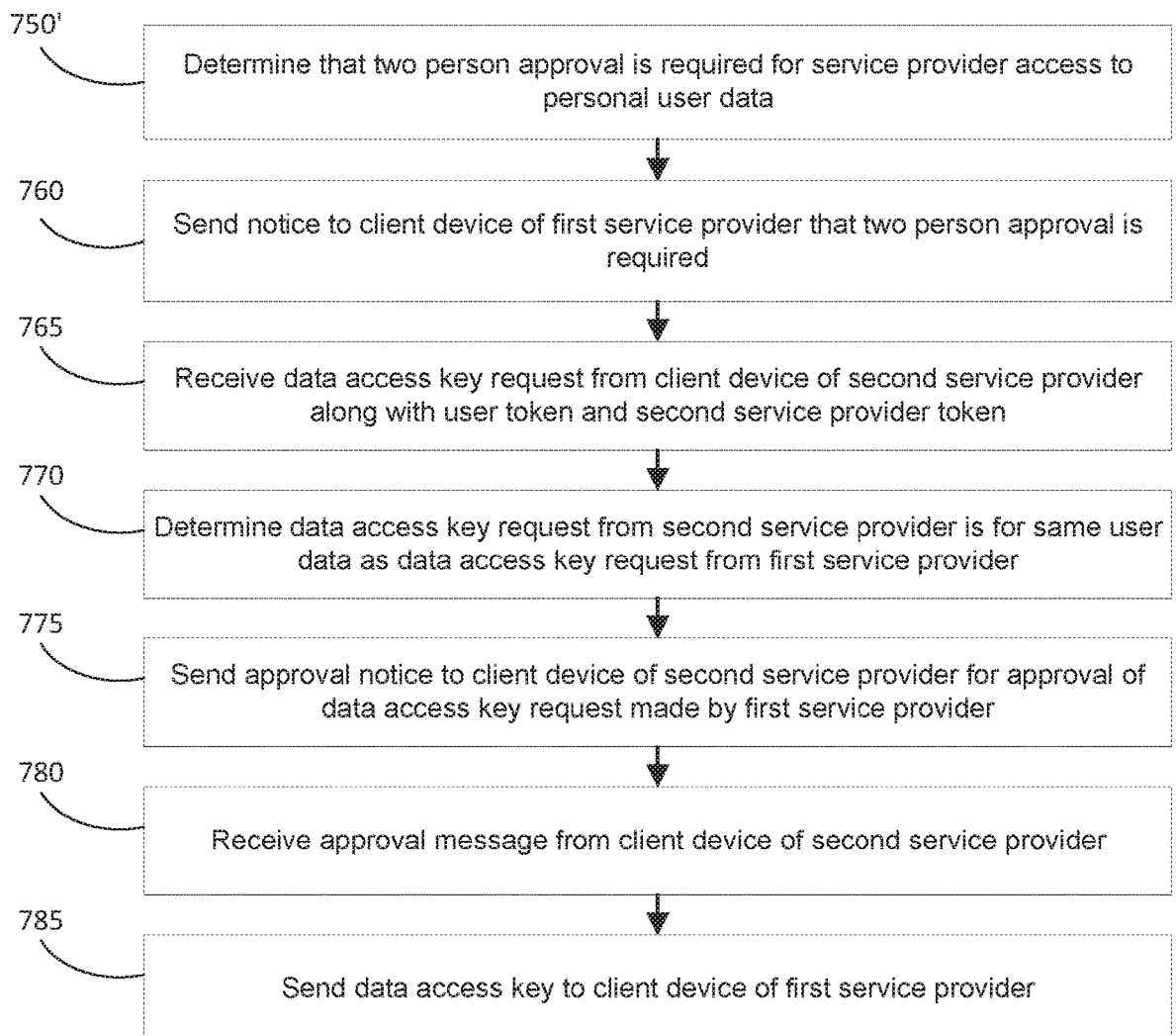

FIG. 7B is a flowchart illustrating a method of data access control 701 according to one or more example embodiments, with reference to components and features described above, including but not limited to the figures and associated description. The features described in FIG. 7B may be in addition to the features referenced in FIG. 7A. The description of blocks referenced in FIG. 7A will not be repeated here. As described above with reference to FIG. 7A, data access control method 700 may be carried out by processor 120 in communication with, via server 110, client device 101 associated with the first service provider and/or client device 103 associated with the second service provider.

According to the method in FIG. 7B, block 750 (referenced in FIG. 7A) is not carried out in the sequence shown in FIG. 7A. Instead, with reference to FIG. 7B, at block 750' it is determined that two person approval is required for service provider access to personal user data.

At block 760, a notice is sent to client 101 associated with the first service provider that two person approval requires that a second service provider must approve the data access key request.

At block 765, a data access key request may be received from client device 103 associated with the second service provider, along with a user token and a second service provider token. The second service provider token may include a second service provider key.

At block 770, it may be determined that the data access key request from client device 103 of the second service provider corresponds to the data access key request previously received from client device 101 of the first service provider.

At block 775, an approval notice may be sent to client device 103 of the second service provider seeking approval of the data access key request made by the first service provider.

At block 780, an approval message may be received from client device 103 of the second service provider indicating approval, by the second service provider, of the data access key request made by the first service provider.

At block 785, a data access key may be sent to client device 101 associated with the first service provider. As described above, the data access key may be stored in database 130, or may be generated based on the user key, on the first service provider key, or on a combination of the user key and the first service provider key, or on a combination of the user key, the first service provider key and the second service provider key.

Figure 7C:
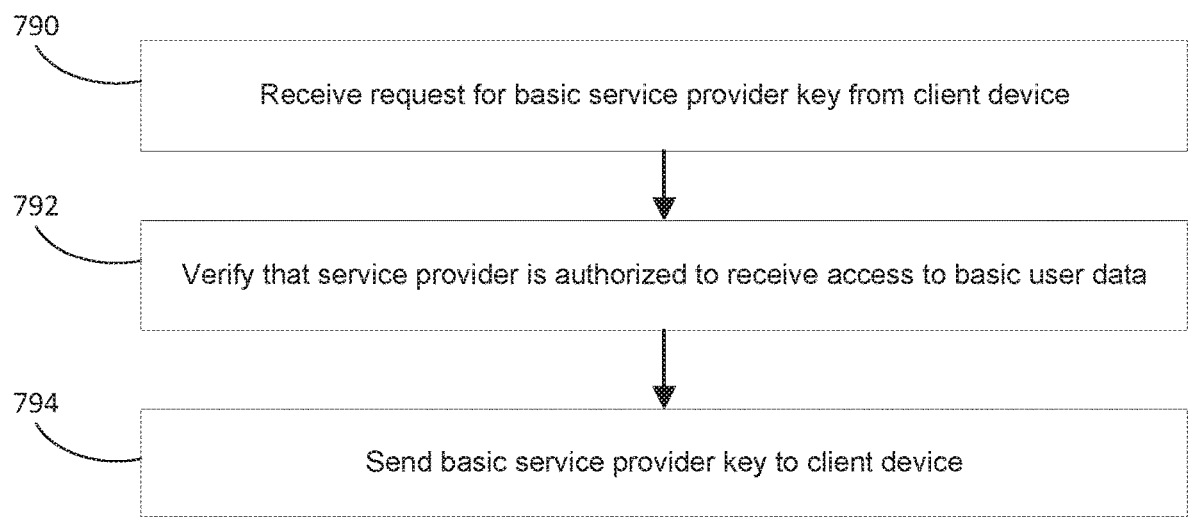

FIG. 7C is a flowchart illustrating a method of data access control 702 according to one or more example embodiments, with reference to components and features described above, including but not limited to the figures and associated description. The features described in FIG. 7C may be in addition to the features referenced in FIG. 7A or 7B. The description of blocks referenced in FIGS. 7A and 7B will not be repeated here. As described above with reference to FIGS. 7A and 7B, data access control method 700 may be carried out by processor 120 in communication with, via server 110, client device 101 associated with the first service provider and/or client device 103 associated with the second service provider.

At block 790, a request for a basic service provider key is received from client device 101. As discussed above, the basic service provider key may be requested at any time, according to arrangements or protocols that the service provider (or service provider entity) may have with system 100. Requesting the basic service provider key does not require the service provider to be in the vicinity of short-range transceiver 105, and the basic service provider key may be sent to client device 101 independently of any tap action with short-range transceiver 105.

At block 792, the processor may verify that the service is authorized to receive access to basic user data (and thus authorized to obtain a basic service provider key). Authorization may be based on the identity of the service provider, and may include retrieval of information from database 130.

At block 794, a basic service provider key may be sent to client device 101 associated with the service provider. The service provider key may be stored in database 130, or may be generated by the system based on the identity of the service provider.

Figure 8:
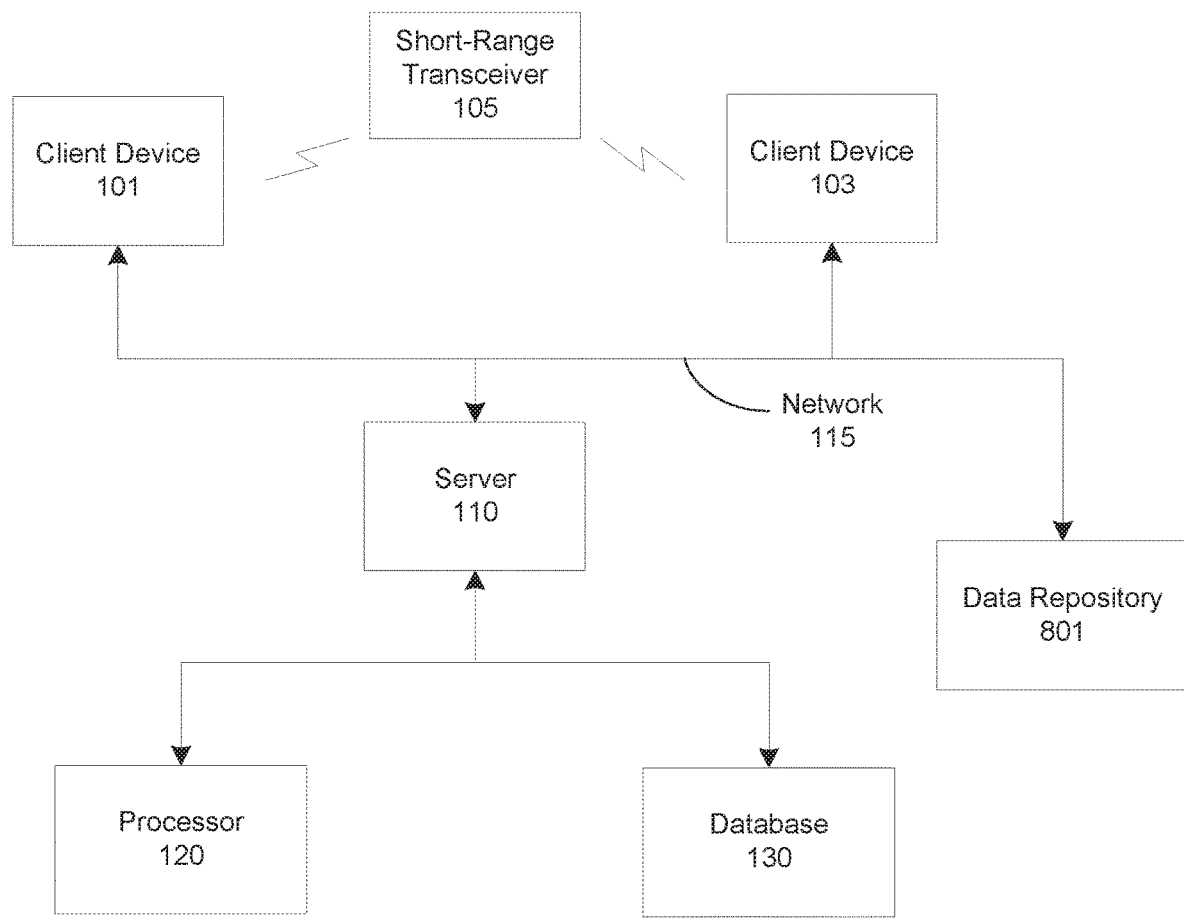
FIG. 8 is a diagram of a data access control system according to one or more example embodiments.

FIG. 8 shows a diagram illustrating a data access control system 800 according to one or more example embodiments.

FIG. 8 references similar components of example embodiment system 100 as illustrated in FIG. 1A, and description of those components will not be repeated here. In addition to components relating to system 100 as illustrated in FIG. 1A and described above, system 800 may include a data repository 801. Data repository 801 may include a database having some or all of the same or similar structure, functionality or features as described above for database 130. Data repository may also include or incorporate a server having some or all of the same or similar structure, functionality or features as described above for server 110. Data repository may also include or incorporate a processor having some or all of the same or similar structure, functionality or features as described above for processor 120. Data repository is configured to store personal user data, such as personal user data of the type described above with respect to personal user data 305 in FIG. 3. Data repository may store the personal user data in an encrypted format, or may encrypt the personal user data before sending to an authorized service provider. Data repository 801 may be operated by the same or related entity as operating system 100, or may be operated by a third party.

In operation, system 800 may carry out all or many of the same functions as performed by the components of system 100, as described above, for handling a request for a data access key to access personal user data. Once system 800 verifies that the service provider is authorized to receive access to personal user data, processor 120 may generate a link to the data repository where the personal user data is stored. In an example embodiment, processor 120 may provide information (such as, e.g., an electronic address for data repository 801) in addition to or instead of the link to data repository 801.

Processor 120 may retrieve a data access key or generate a data access key as described above (including, e.g., generated based on the user key or based on the user key and service provider key). Processor 120 may send to client device 101 the data access key and the link to data repository 801 where the personal user data may be located. Upon receiving the data access key and the link to data repository 801, client device 101 may then retrieve the encrypted personal user data from data repository 801, based on the link. For example, client device 101 may transmit to data repository 801, via the link, a request for the encrypted personal user data and receive the encrypted personal user data from data repository 801. Once client device 101 has obtained the encrypted personal user data, client device 101 may use the data access key to decrypt the encrypted personal user data. Once the personal user data is decrypted, client device 101 may access and use the personal user data as described above.

In some example embodiments, data repository 801 may store the same personal user data as stored on transceiver 105. In some example embodiments, the personal user data is stored in data repository 801 instead of being stored on transceiver 105. In some example embodiments, personal user data may be stored in data repository 801, and only a limited set of user data (such as, for example, basic user data) may be stored on transceiver 105. In some example embodiments, the personal user data stored in data repository 801 may be updated. The updated personal user data may be stored in data repository 801 and transmitted to client device 101 upon request for the personal user data.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling data access, comprising:
   receiving, from a first client device via a network, a user token, a service provider token, and a request for a data access key to decrypt encrypted personal user data stored on a contactless card associated with a user;
   identifying a service provider based on the service provider token;
   identifying the user based on the user token;
   verifying that the service provider is authorized to receive access to personal user data stored on the contactless card;
   retrieving a user key associated with the user and a first service provider key associated with the service provider from a database;
   generating the data access key based on the user key and the first service provider key; and
   transmitting the data access key to the first client device, wherein the request for the data access key is generated in response to a tap action between the contactless card and the first client device.

2. The method of claim 1, wherein the encrypted personal user data is encrypted using the user key.

3. The method of claim 1, wherein the database stores a user identifier associated with the user and a service provider identifier associated with the service provider.

4. The method of claim 3, wherein the first service provider key is valid for a limited period of time.

5. The method of claim 1, further comprising receiving, from a second client device via the network, a second service provider key, wherein the data access key is generated based on the user key, the first service provider key, and the second service provider key.

6. The method of claim 5, wherein the second service provider key is transmitted by the second client device in response to a tap action between the contactless card and the second client device.

7. The method of claim 1, wherein the user token comprises the user key, further comprising authenticating the user based on the user key.

8. The method of claim 1, wherein the service provider token comprises the service provider key, further comprising authenticating the service provider based on the first service provider key.

9. The method of claim 1, further comprising identifying the service provider as the sender of the request for the data access key based on the service provider token.

10. A data access control system, comprising:
    a server comprising a processor and a memory, the server in data communication with a database and a client device; and
    a contactless card associated with a user, the contactless card comprising a processor, a memory, and a communications interface, the memory of the contactless card storing a user token and encrypted personal user data associated with the user,
    wherein the server is configured to:
      receive, from the client device via a network, the user token, a service provider token, and a request for a data access key to decrypt the encrypted personal user data,
      identify the user based on the user token,
      verify the service provider is authorized to receive access to the personal user data, retrieve a user key and a service provider key from the database, generate the data access key based on the user key and the service provider key, and transmit the data access key to the client device, wherein the request for the data access key is generated in response to a tap action between the contactless card and the client device.

11. The data access control system of claim 10, wherein the memory of the contactless card further stores basic user data associated with the user, the basic user data encrypted with a basic service provider key.

12. The data access control system of claim 11, wherein the server is further configured to identify the service provider based on the service provider token.

13. The data access control system of claim 11, wherein the basic service provider key is valid only for a predetermined period of time.

14. The data access control system of claim 13, wherein the database stores a user identifier associated with the user, a service provider identifier associated with the service provider, the service provider key associated with the service provider, and the basic service provider key associated with the service provider.

15. The data access control system of claim 11, wherein the server is further configured to:

receive a request for the basic service provider key, verify that the service provider is authorized to receive the basic service provider key, and transmit, to the client device, the basic service provider key.

16. The data access control system of claim 12, wherein the request for the basic service provider key is independent of the tap action between the contactless card and the client device.

17. The data access control system of claim 11, wherein the server is further configured to log each transmission of the basic service provider key.

18. A data access control server, comprising:

a processor; and a memory, wherein the processor is in data communication with a database and a first client device, and wherein, in response to receipt of a user token, a service provider token, and a request for a data access key to decrypt encrypted personal user data stored on a contactless card associated with a user, the processor is configured to:

identify the user based on the user token, verify the service provider is authorized to receive access to the personal user data, retrieve a user key and a service provider key from the database, generate the data access key based on the user key and the service provider key, and transmit the data access key to the first client device, wherein the request for the data access key is generated in response to a tap action between the contactless card and the first client device.

19. The data access control server of claim 18, wherein:

the processor is further configured to receive a service provider token, and the service provider key is valid only for a predetermined period of time.

20. The data access control server of claim 18, wherein the service provider comprises at least one selected from the group of a first responder and emergency health care provider.

* * * * *